US007643658B2

(12) United States Patent
Kilner et al.

(10) Patent No.: US 7,643,658 B2
(45) Date of Patent: Jan. 5, 2010

(54) DISPLAY ARRANGEMENT INCLUDING FACE DETECTION

(75) Inventors: Andrew Roger Kilner, Basingstoke (GB); Victoria Sophia Jennings, Basingstoke (GB); Sebastian Aleksander Paszkowicz, Coventry (GB); Robert Mark Stefan Porter, Winchester (GB); Ratna Rambaruth, Guildford (GB); Clive Henry Gillard, Alton (GB)

(73) Assignee: Sony United Kingdom Limited, Weybridge (GB)

( * ) Notice: Subject to any disclaimer, the term of this patent is extended or adjusted under 35 U.S.C. 154(b) by 923 days.

(21) Appl. No.: 11/040,587

(22) Filed: Jan. 21, 2005

(65) Prior Publication Data

US 2005/0197923 A1 Sep. 8, 2005

(30) Foreign Application Priority Data

Jan. 23, 2004 (GB) ................................. 0401492.4
May 28, 2004 (GB) ................................. 0412037.4

(51) Int. Cl.
*G06K 9/00* (2006.01)
*G06F 17/30* (2006.01)

(52) U.S. Cl. ........................... 382/118; 382/103; 705/10
(58) Field of Classification Search .................. 382/118
See application file for complete search history.

(56) References Cited

U.S. PATENT DOCUMENTS 5,331,544 A * 7/1994 Lu et al. ........................ 705/10
5,966,696 A * 10/1999 Giraud ......................... 705/14
6,111,517 A * 8/2000 Atick et al. ................. 340/5.83
6,185,314 B1 * 2/2001 Crabtree et al. ............. 382/103
6,246,995 B1 * 6/2001 Walter et al. .................. 705/22
6,263,088 B1 * 7/2001 Crabtree et al. ............. 382/103
6,295,367 B1 * 9/2001 Crabtree et al. ............. 382/103
6,404,900 B1 * 6/2002 Qian et al. .................. 382/103
6,502,076 B1 * 12/2002 Smith .......................... 705/14
6,647,269 B2 * 11/2003 Hendrey et al. ........... 455/456.3
6,793,128 B2 * 9/2004 Huffman ..................... 235/375
6,795,808 B1 * 9/2004 Strubbe et al. .............. 704/275
7,283,650 B1 * 10/2007 Sharma et al. .............. 382/118
2002/0072952 A1 6/2002 Hamzy et al.

(Continued)

FOREIGN PATENT DOCUMENTS

WO WO 01/45004 6/2001

(Continued)

OTHER PUBLICATIONS

Minority Report Advertising (Mini Cooper style), available at http://curtismorley.com/2007/02/06/minority-report-and-mini-cooper/ (describing the technology used in the movie "Minority Report").*

*Primary Examiner*—Bhavesh M Mehta
*Assistant Examiner*—David P Rashid
(74) *Attorney, Agent, or Firm*—Oblon, Spivak, McClelland, Maier & Neustadt, L.L.P.

(57) ABSTRACT

A display arrangement comprises an image display device having a first camera directed towards positions adopted by users viewing the display; one or more further cameras directed towards other respective locations; a face detector for detecting human faces in images captured by the cameras; and means for detecting those faces which appear in images captured by both the first camera and at least one of the further cameras.

15 Claims, 16 Drawing Sheets

U.S. PATENT DOCUMENTS

| | | | |
|---|---|---|---|
| 2002/0075332 A1* | 6/2002 | Geilfuss et al. | 345/859 |
| 2002/0107729 A1* | 8/2002 | Katz | 705/14 |
| 2002/0178447 A1* | 11/2002 | Plotnick et al. | 725/36 |
| 2002/0184098 A1* | 12/2002 | Giraud et al. | 705/14 |
| 2002/0190119 A1* | 12/2002 | Huffman | 235/375 |
| 2003/0001846 A1* | 1/2003 | Davis et al. | 345/474 |
| 2003/0018522 A1* | 1/2003 | Denimarck et al. | 705/14 |
| 2003/0044046 A1* | 3/2003 | Nakamura et al. | 382/103 |
| 2003/0088832 A1* | 5/2003 | Agostinelli et al. | 715/526 |
| 2003/0208754 A1* | 11/2003 | Sridhar et al. | 725/34 |
| 2004/0095604 A1* | 5/2004 | Meyerhofer | 358/1.18 |
| 2004/0158865 A1* | 8/2004 | Kubler et al. | 725/82 |
| 2006/0039733 A1* | 2/2006 | Meyerhofer | 400/62 |

FOREIGN PATENT DOCUMENTS

WO   WO 2004/051551   6/2004

* cited by examiner

U.S. 7,643,658 B2

DISPLAY ARRANGEMENT INCLUDING FACE DETECTION

The present application is based on UK Application No. 0412037.4, filed on May 28, 2004 and UK Application No. 0401492.4, filed on Jan. 23, 2004, which are each incorporated herein by reference in their entirety.

BACKGROUND OF THE INVENTION

1. Field of the Invention

This invention relates to displays.

2. Description of the Prior Art

Electronic displays are commonly used in shops and other public areas to carry advertising material and the like. Such an arrangement may be referred to as "digital signage".

A common arrangement is for a television monitor and video player (e.g. a VHS cassette tape player) to play out material encouraging shoppers to buy goods laid out near to the television monitor. A more advanced arrangement is provided by, for example, the Sony® NSP100™ digital playout system. This device is a networked playout device which receives video (and, optionally, audio) material and a playout schedule over a digital network, and then plays out the video and audio material on a display device at times indicated by the schedule.

While these arrangements provide a degree of user control over the material played out—for example, the user can select a tape cassette or can load desired material onto the NSP100 playout system—it is relatively difficult to tailor the displayed material to best suit a current audience.

WO 01/45004 and U.S. Pat. No. 5,966,696 disclose digital signage arrangements which use a detection of the audience to affect the material played out. In U.S. Pat. No. 5,966,696, proximity detectors are used to detect the presence of a viewer at a display screen, which causes the display screen to be switched from an idle to an active mode. WO 01/45004 purports to use a detection of certain characteristics of a viewer in front of a display screen to control the selection of material to be played out at that display screen.

SUMMARY OF THE INVENTION

This invention provides a display arrangement comprising:

an image display device having a first camera directed towards positions adopted by users viewing the display;

one or more further cameras directed towards other respective locations;

a face detector for detecting human faces in images captured by the cameras; and means for detecting those faces which appear in images captured by both the first camera and at least one of the further cameras.

The invention provides an improvement in, for example, the field of digital signage, by correlating a face detection of a viewer observing a display screen—which might, for example, be displaying advertising material—with a detection of that same viewer by a camera at another location. The other location might be, for example, a shop checkout, or a place in a shop where certain goods (e.g. the goods relating to the displayed advertising material) are arranged for user purchase. This arrangement can thus give improved feedback to the originators of the advertising material as to the success of that material in persuading consumers to buy a product.

Various other respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
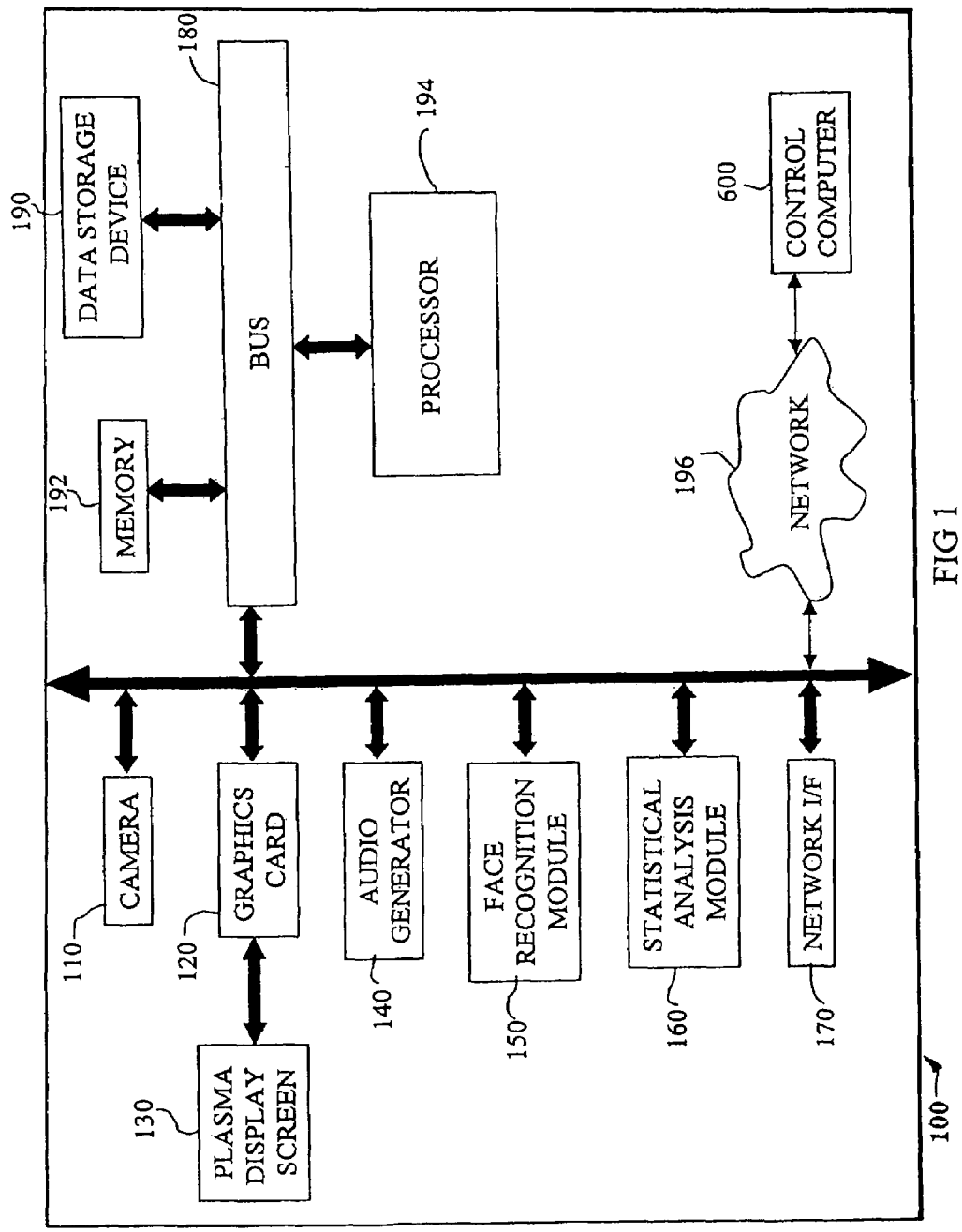
FIG. 1 schematically illustrates a display arrangement according to the present technique.

FIG. 1 schematically illustrates a display arrangement according to the present technique. The display arrangement is located at a predetermined position in a store (shop), mounted on a shelf amongst products displayed for sale. The display arrangement 100 comprises: a camera 110; a graphics card 120; a plasma display screen 130 (of course, other types of display could be used); an audio generator 140; a face detection/recognition module 150; a statistical analysis module 160; a network interface 170; a communication bus 180;

a data storage device 190; local memory 192 and a processor 194. The display device is connected to a network of such devices through a communications network 196. A control computer 600 communicates with the display arrangement 100 via the network 196.

The camera 110 is integral to the mounting of the plasma display screen 130 and is used to capture images of human faces as they view the display screen. The captured video images are analysed to detect human faces and to perform facial recognition analyses. The camera 110 is discreetly mounted, perhaps in a frame of the display, so as not to distract the viewer's attention from the promotional display presentation comprising advertising images for products or services available and so as not to inhibit a viewer's normal reaction to the displayed material.

The plasma screen 130 is driven by the graphics card 120 and presents display information from a selection of possible promotional display sequences stored on the data storage device 190. The processor 194 is (or is based on) a Sony™ NSP100™ processor and is operable to control download of display sequences via the network 196. The basic NSP100 processor generally operates in a "push" mode, which is to say that it receives content pushed to it by a server, and displays that content. Here, the processor 194 can also operate in a "pull" mode by which it requests or downloads appropriate content for display, for example in dependence on the nature of the viewing audience.

The control computer 600 can configure the local display arrangement, the particular configuration determining the selectable range of display sequences available at the particular plasma display screen 130.

The graphics card 120 comprises an MPEG (or a proprietary format used in the NSP100) decoding unit that facilitates display of stored MPEG format display material on the plasma screen.

The audio generator 140 co-operates with the graphics card to produce sound effects for the promotional display sequence. The sound effects may be reproduced either with an MPEG video sequence or independently, as required for a particular application.

The face detection/recognition module 150 comprises face detection software to identify the presence of human faces that appear within a predetermined spatial range of the camera (and associated display screen) and face recognition software. The face recognition software is operable to recognise individual faces previously detected at the same camera, at other camera locations or stored within a database of detected faces. The face detection algorithm works by analysing the field of view for shapes that could be human faces and searching for matches of features of a detected object with template facial features stored in memory. Facial movements such as eye-blinks and mouth movements can also be used to determine whether face-like objects indeed correspond to human faces.

A set of characteristic facial parameters is established by analysis of the colour darkness levels of image pixels. Facial features such as eyes, eyebrows, cheekbones and noses can be identified by searching for abrupt changes in darkness levels across adjacent image regions. Colour histograms of image pixels can be used to detect skin tone and hair colour. A plurality of anchor points on a detected face can be defined to provide a representation of facial bone structure. The anchor points are determined from changes in darkness levels. The anchor points typically include the corners of the mouth, points on the brow line, cheek bones and points corresponding to the bridge and the tip of the nose. The anchor points are joined to form a mesh of triangles and the angles of each triangle are used as a characteristic set of facial parameters that can be used to match similar detected faces and thus to perform facial recognition analysis.

In an alternative arrangement, a so-called eigenface method of face recognition is used. According to the eigenface method the face as a whole is examined, rather than local facial features. A database of detected faces is first analysed to define a composite face and each newly detected face is compared as a whole to the composite face. A numerical value specifying differences between a detected face and the composite face is used as the characteristic facial parameter data.

A specific example of face detection, tracking and similarity detection will be described below with reference to FIGS. 12 to 17. Note that the similarity detection technique described below is sufficient for the present purposes. In other words, it is not necessary (though it can be interesting) to know whose face is being captured at different cameras; it is enough to know that it is (probably) the same face at the different cameras.

The skilled man will appreciate that face detection techniques and the like do not tend to give an absolute answer, but rather a probability that an image area represents a face, or that a set of images from two cameras contain the same face, and so on. The probabilities can be compared with a threshold to give a result which appears to be a clear "yes" or "no", but its derivation will still be via a statistical process.

The statistical analysis module 160 maintains cumulative statistical data on the human faces detected locally by the camera 110 including a headcount of distinct faces, gender data, age category data and time spent by each detected face within a predetermined spatial range of the plasma display screen 130 (i.e. the in-shot time). The face detection/recognition module 150 is operable to detect both the in-shot time of each human face and the dwell time, which is the time for which the detected human face directly views (i.e. is oriented directly towards) the display screen 130. A cumulative dwell time may also be recorded. The cumulative dwell time represents the total time spent either by all detected faces within a given time period or by a predetermined category of detected faces (e.g. male faces or children's faces) directed towards the display screen associated with the particular camera). Alternatively, a cumulative dwell time can be calculated for a given face ID or for a given category of faces such that it represents the total dwell time at a plurality of different display screens/cameras at different locations in the network. The local memory 192 is available for local data processing and for storage of a limited quantity of local statistical data prior to the downloading of that data for a global statistical analysis by the control computer 600.

It will be appreciated that display technologies other than plasma screens can be used. It will also be appreciated that within the context of a store-wide network, the skilled person can select which processing operations should take place at a display terminal and which should take place at one or more central servers. Indeed, some operations may take place at both, depending on the nature of the operation. For example, some statistical operations used to determine which content should be displayed may be best carried out quickly and locally at the terminal. A more detailed analysis of the same information, for example to harvest data for marketing advertising space on the displays, could be carried out at a server.

Figure 2:
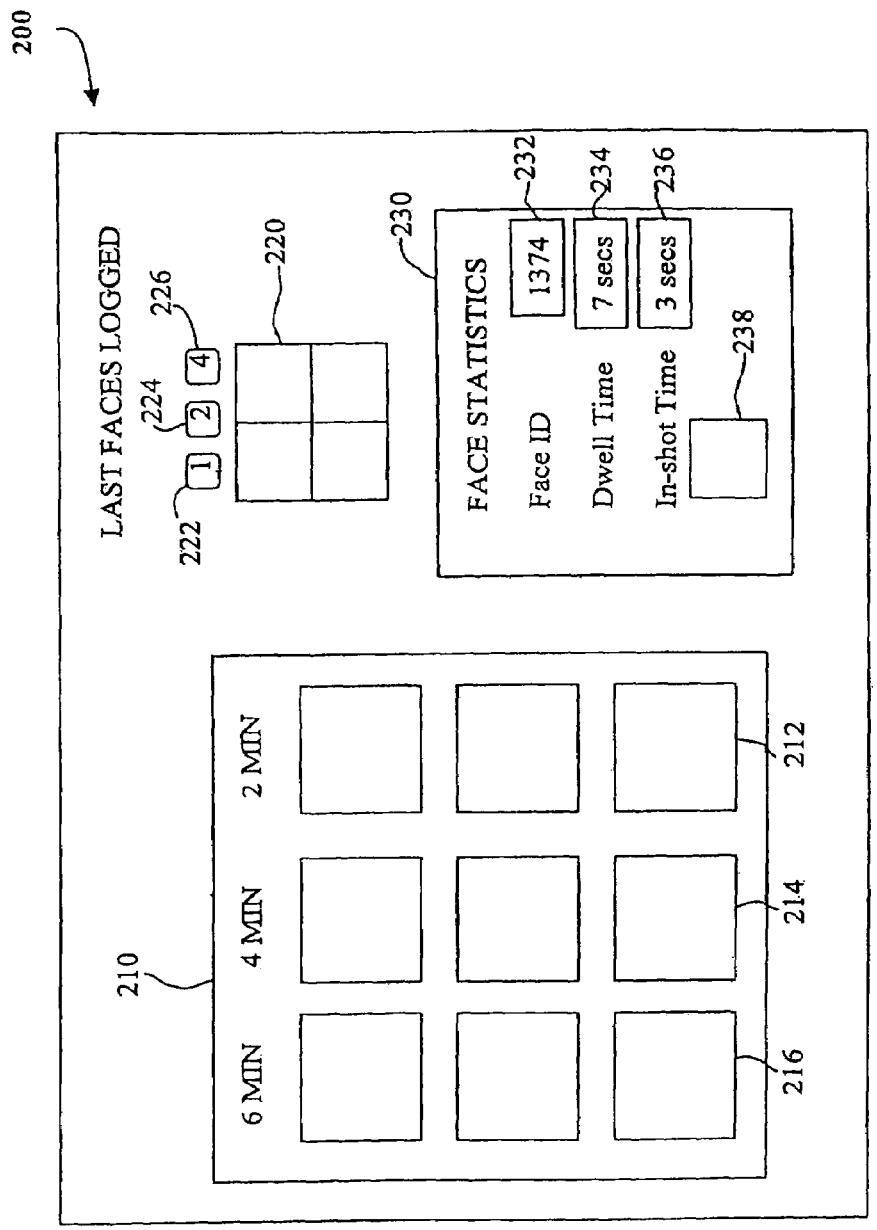
FIG. 2 schematically illustrates a graphical user interface for displaying information captured by a camera and associated face detector at a specific location.

FIG. 2 schematically illustrates a graphical user interface (GUI) for displaying information captured by a camera and associated face detector at a specific location. The GUI 200 comprises a grid 210 of recently detected faces. Representative keystamp images of the detected human faces appear to the right of the grid at position 212 and progress to the left through positions 214 and 216 as time elapses. In this particular arrangement a representative keystamp is created from a given image sequence by performing a colour histogram analysis of the pixel data of each image frame, determining an averaged colour histogram and selecting as the representative keystamp an image from the sequence that is close in content to the averaged colour histogram.

The images at 212 were captured two minutes ago; the images at 214 were captured four minutes ago and the images at 216 were captured 6 minutes ago as indicated by the grid column headings. Each row of the grid represents images presented to a given camera 110. A GUI panel 220 is used to display a number of most recently logged faces. The number of faces displayed in this GUI panel is selectable by a user highlighting the appropriate button 222, 224, or 226 on the display screen corresponding respectively to one, two and four images. The GUI 200 also comprises a face statistics panel 230 associated with a user-selected one of the representative keystamp images displayed in the recently logged faces GUI panel 220. A representative keystamp image 238 with which the statistics are associated is also displayed within the face statistics panel 230. In this example arrangement the statistics displayed are a face ID 232, a cumulative dwell time 234 of detected faces at the given camera, which in this example is seven seconds and the in-shot time 236, which is three seconds. The cumulative dwell time in this case represents the cumulative time spent by all detected faces (of any category) oriented directly towards the plasma display screen.

Figure 3:
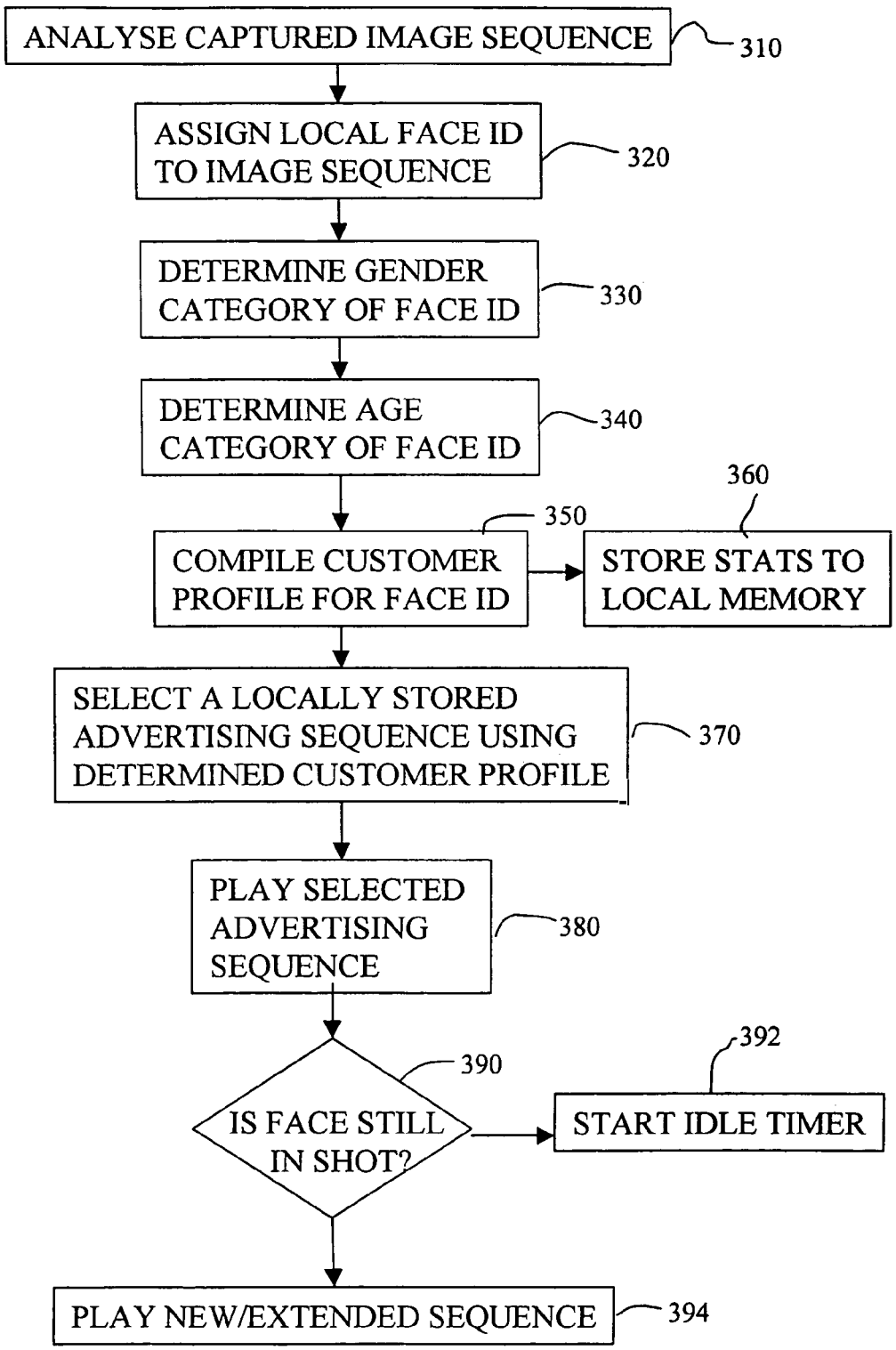
FIG. 3 is a flow chart that schematically illustrates how a set of images to be displayed is selected in dependence upon the category of face detected by a face detector.

FIG. 3 is a flow chart that schematically illustrates how a set of images to be displayed is selected in dependence upon the category of face detected by the face detection/recognition module 150.

At a stage 310 a captured image sequence is analysed locally by the face detection/recognition module 150. The analysis may be at least partially performed before image capture associated with the detected face has terminated.

At a stage 320 a local face ID is assigned to the captured image sequence (or to one face in the sequence) in dependence upon predetermined characteristics of the detected human face.

Next, at a stage 330, the statistical analysis module 160 determines the gender category (i.e. male/female) of the detected face based on information derived from the face detection/recognition module 150 and at a stage 340 the detected face is placed in one of a number of predetermined or variable age categories: such as child; adolescent; working-age adult; retired adult. In general, the age categories may well be decided by the marketing requirements of the products on sale. The age category may be determined by the face detection/recognition module 150 from an analysis of the skin tone/texture, hair colour and the relative proportions of the facial features.

At a stage 350, the gender category and age category associated with the local face ID and additional information including the current day and time, the in-shot time and dwell time are assimilated as a customer profile and this information is stored to local memory 192 (and optionally to remote memory) at a stage 360.

In alternative arrangements additional information such as ethnic origin, specific physical characteristics and categories of emotional expressions can be used to establish or augment the customer profile.

Next, at a stage 370, one of a plurality of locally stored promotional sequences is selected for display on the plasma screen 130 in dependence upon the customer profile that was determined at the stage 350. The promotional sequence is selected such that it is specifically targeted at the particular customer profile.

At a stage 380 the selected promotional display sequence and any accompanying audio data are retrieved from the local data storage device 190, decoded by the graphics card 120 and the audio generator and presented to the customer using the plasma display screen 130.

At a stage 390, when the selected advertising sequence has been displayed once from beginning to end, it is detected via the camera 110 and face detection/recognition module 150 whether the same human face is still in shot. If not, and no other face is detected in shot then an idle timer is triggered at a stage 392 to monitor the time elapsed between detection of individual human faces. However, if the human face having the same face ID allocated at the stage 320 is still in shot at the stage 390 then the process proceeds to a stage 394 whereupon either an extended advertising sequence directed to the same product as the initial advertising sequence is displayed, or a newly selected promotional sequence that is also appropriate to the customer profile is displayed on the plasma screen 130.

Figure 4:
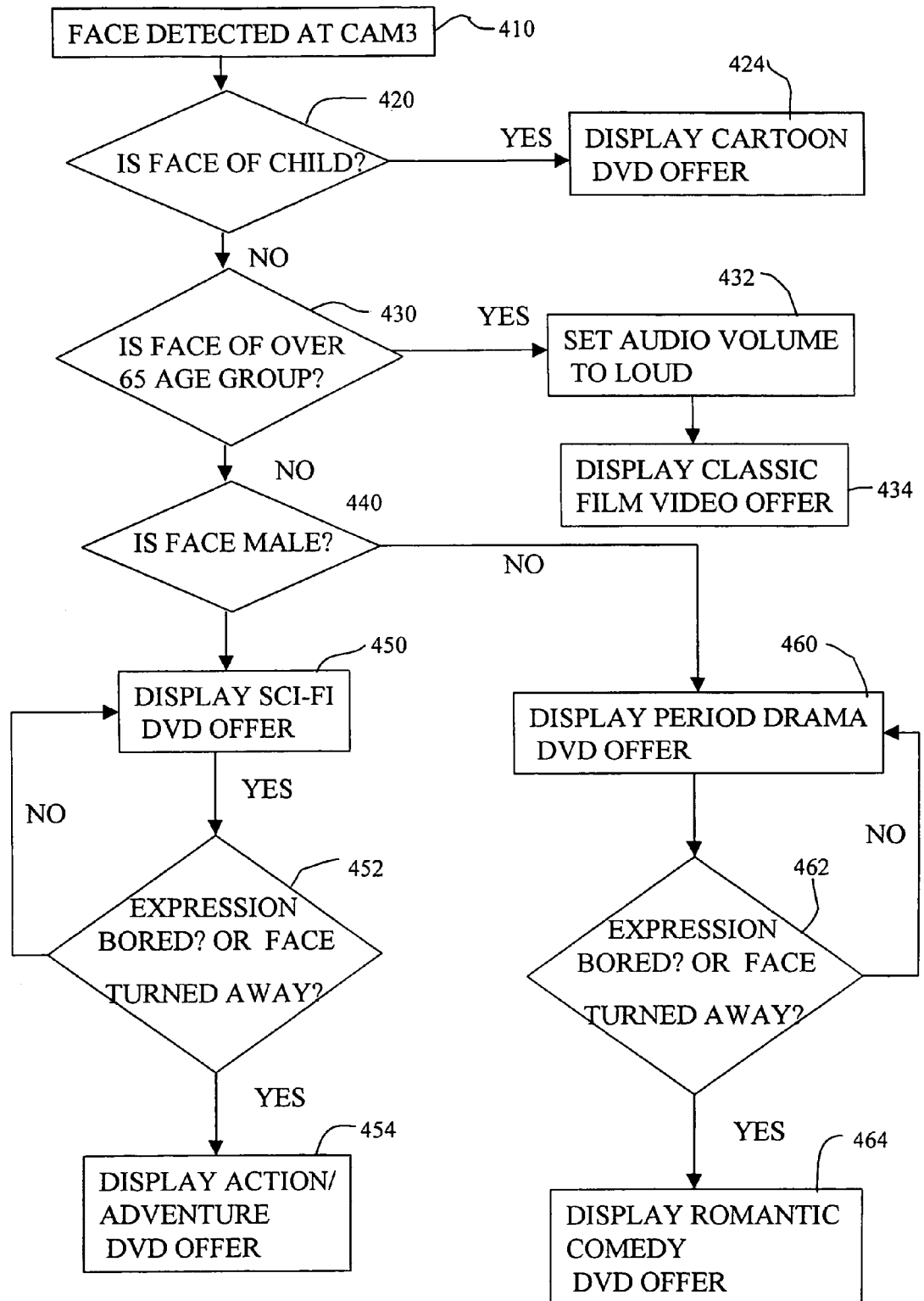
FIG. 4 is a flow chart that schematically illustrates how a particular set of images is displayed in dependence upon the age, gender and facial expression category of a detected face.

FIG. 4 is a flow chart that schematically illustrates an example of how a particular set of images is selected and displayed in dependence upon the age, gender and facial expression category of a detected face.

At a stage 410 a face is detected by a camera, which is associated with a plasma display screen 110 located in the audio/video sales section of the store.

At a stage 420 the face detection/recognition module determines if the detected face is the face of a child and, if so, displays a promotion for a cartoon digital video disc (DVD) offer. However, if at the stage 420 it is determined that the detected face does not belong to a child the process proceeds to a stage 430, where the face detection/recognition module determines whether the detected face is likely to belong to the over sixty-five age group. If the face is in fact categorised as over sixty-five then the audio generator 140 is controlled to set a louder than normal audio volume at a stage 432 and subsequently at a stage 434 a classic film video promotional sequence is displayed on the plasma screen 110.

If at the stage 430 it is determined that the detected face does not belong to the over sixty-five age group then it is determined at a stage 440 whether or not the detected face is male. If the face is in fact male the process proceeds to a stage 450 whereupon a science-fiction DVD offer is displayed on the plasma screen 130. During display of the science-fiction promotional sequence, the camera 110 continues to monitor (at a stage 452 ) the male face and determines whether the facial expression can be categorised as one of boredom at any point during the display of the promotional material or whether the detected face begins changes orientation such that it is no longer directly viewing the display screen. If no such detection is made then the sci-fi DVD promotion continues to be displayed to the customer. However, if a bored face is in fact detected or if the face turns away from the display by more than a predetermined angle then the process proceeds to a stage 454 and a different promotional sequence is displayed on the display screen, in this case a promotion for an action/adventure DVD offer, in an attempt to regain the attention of the viewer and increase the cumulative dwell time.

If at a stage 440, the detected face was determined to be female then at a stage 460 a period drama DVD promotional sequence is launched on the plasma display screen 130. During display of the period drama promotional sequence, the camera 110 continues to monitor (at a stage 462) the female face and determines whether the facial expression can be categorised as one of boredom at any point or whether the detected face begins to change orientation such that it is no longer directly viewing the display screen. If no such detection is made then the period drama promotion continues to be displayed to the female customer. However, if a bored face is in fact detected or if the face turns away from the display screen then the process proceeds to stage 464 and a promotional sequence for a romantic comedy DVD is instead presented on the plasma display screen 130.

The flow chart of FIG. 4 relates to promotion of products but it will be appreciated that advertisements for services such as financial services could alternatively be displayed on the plasma display screens. Furthermore, rather than selecting the promotional display according to the detected characteristics of an individual customer, data from the statistical analysis module 160 could be used to determine the frequency of detection of faces in a particular age or gender category over a predetermined time interval and a promotional sequence could be selected in dependence upon the relative frequencies of detected faces in the different categories. Alternatively, a historical database of detected faces could be used to determine the most likely category of customer to be present in the store on a given day of the week at a given time and the displayed promotional sequences could be selected accordingly.

Figure 5:
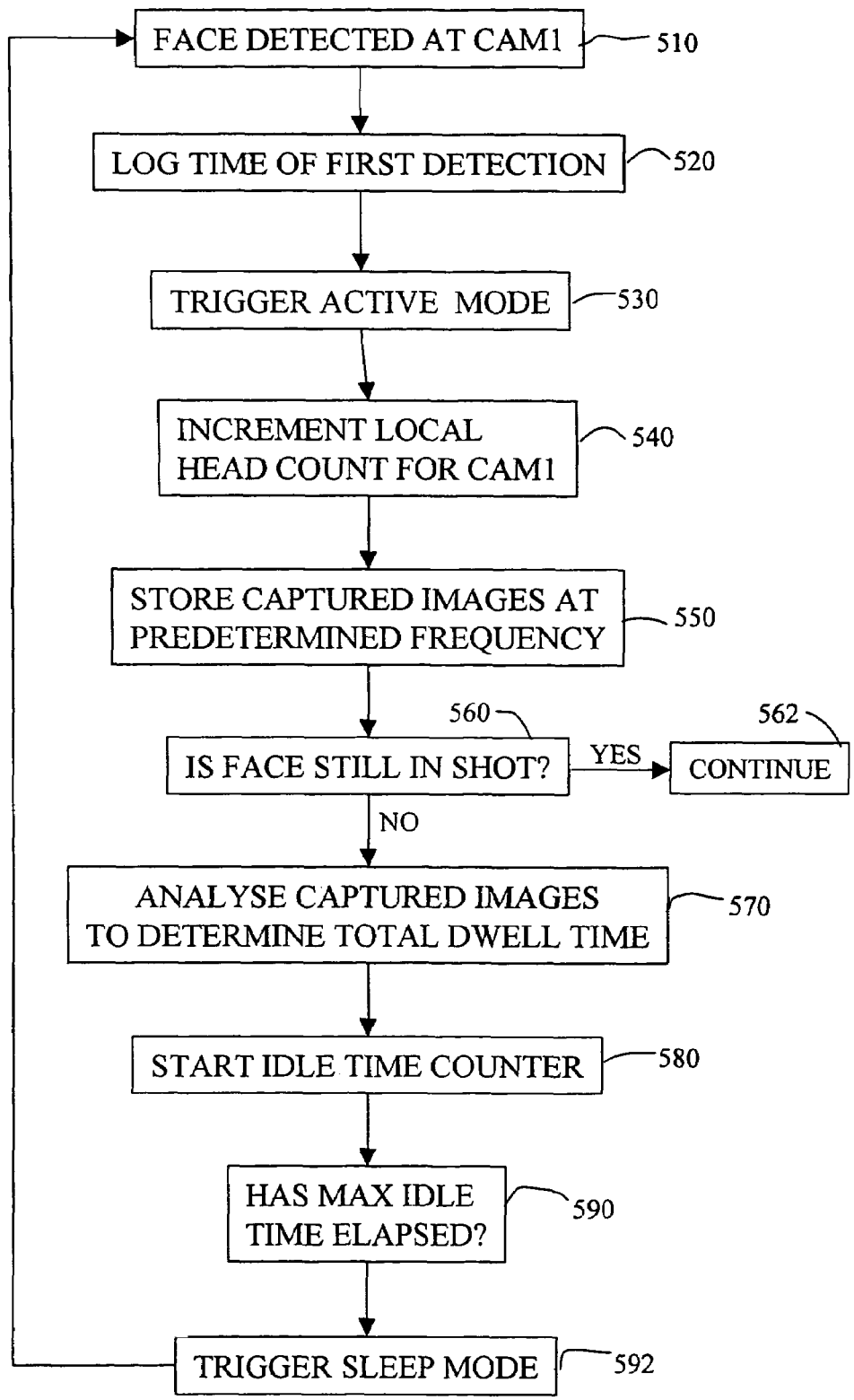
FIG. 5 is a flow chart that schematically illustrates how the display arrangement of FIG. 1 is controlled to transition between an idle mode and an active mode in dependence upon output of the face detector.

FIG. 5 is a flow chart that schematically illustrates how the display arrangement of FIG. 1 is controlled to transition between an idle mode and an active mode in dependence upon output of the face detection/recognition module 150.

The display screen 130 is initially in an inactive mode, which is a power-saving state but the camera 110 and face detection/recognition module 150 are still powered-up and fully operational. At stage a 510 the face detection/recognition module detects the presence of a human face at camera 1 and at a stage 520 the statistical analysis module 160 logs the time of first detection of the human face.

At a stage 530 the processor 194 sends a control signal to the plasma display screen 130 to initiate an active mode in which full power is supplied to the screen and display of a promotional image/audio sequence is initiated.

At a stage 540 the statistics analysis module 160 increments the local head count for camera 1. Prior to incrementing the local head count a cross-check is performed, by the face detection/recognition module 150, of recently detected faces to determine if the currently detected face has been recently logged at the same camera and, if this is the case, then the local head count is not incremented. The time window over which this cross-check is performed in this particular arrangement is a 2 hour period, but the period is configurable by an operator via the control computer 600.

At a stage 550, a subset of images of the human face captured by the camera is stored either in the memory 192 or on the data storage device 190 for subsequent viewing and/or analysis. The images are captured at a predetermined frequency and quality that is set in dependence upon the available storage capacity.

At a stage 560 the face detection/recognition module 150 determines whether or not the human face is still in shot. If the face is determined to be still in shot then the image capture continues at a stage 562. However, if it is determined that the human face is not in shot then an in-shot timer is stopped and at a stage 570 the captured image sequence is analysed by the face detection/recognition module 570 to detect the total dwell time of the identified human face at camera 1. The total dwell time is the time that the face was oriented directly towards the camera (within a given tolerance margin) and hence the display screen.

At a stage 570 the cumulative dwell time (for customers of all face categories) is also incremented to include the dwell time of the currently detected face. At a stage 580, when it has been determined that the human face is not longer in shot of camera one and that no other human face is in shot, an idle time counter is started. While the idle time counter is running it is determined whether the maximum idle time, which in this case is set to be five minutes, has elapsed. During this time the display screen remains in active mode, but displays a static image rather than an animated sequence. When the idle time exceeds the maximum idle time without a further human face having been detected by the face detection/recognition module 150, the processor 194 powers down the plasma display screen into an inactive mode at a stage 592 to reduce power consumption.

In this arrangement the idle time counter begins to count as soon as it is determined that there is no human face in shot, but in alternative arrangements (such as that described above with reference to FIG. 3) the idle time counter could be started only at the end of a given promotional sequence if it is determined at that stage that a human face is no longer in shot.

Figure 6:
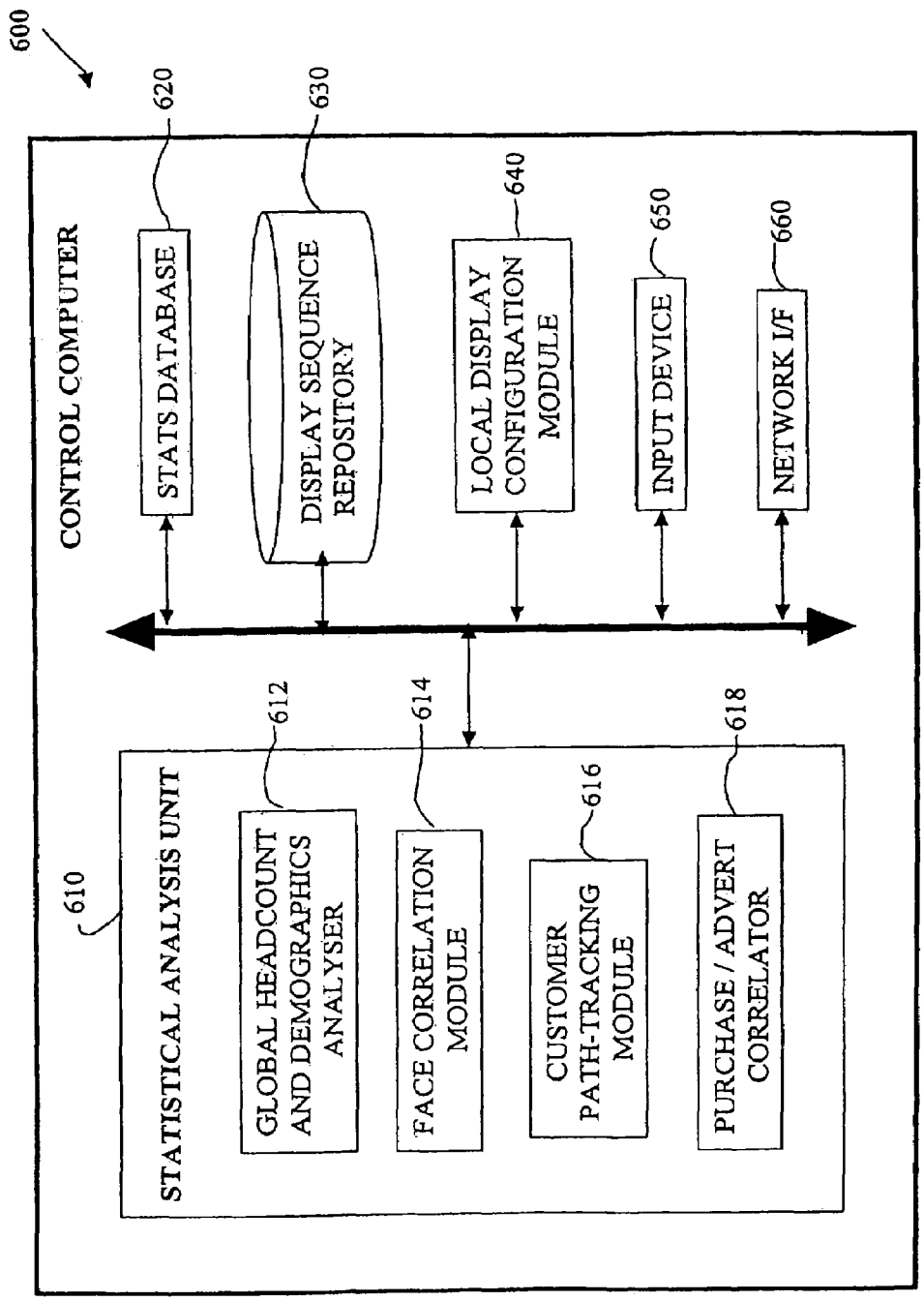
FIG. 6 schematically illustrates the components of a control computer that controls a plurality of networked display devices.

FIG. 6 schematically illustrates the components of a control computer 600 that controls a plurality of networked display devices. The control computer collates and analyses statistical information downloaded from each of the local display arrangements located throughout the store. It will be appreciated that the statistical analysis will be (or could be) at least partially performed locally at individual display arrangements using individual face detection/recognition modules 150 and statistical analysis modules 160.

In this particular arrangement a control computer 600 is provided to collate statistics from individual cameras, to store a historical database of detected faces and to perform an overall statistical analysis of detected human faces at the plurality of locations. Alternative arrangements perform the overall analysis in a distributed manner without the need for a control computer 600, for example using a "grid" type computer system.

The control computer comprises: a statistical analysis unit 610 having a global headcount and demographics analyser 612, a face correlation module 614, a customer path-tracking module and a purchase/advert correlator; a statistics database 620; a display sequence repository 630; a local display configuration module 640; an input device 650 and a network interface 660 which, amongst other functions, can provide access to a remote storage facility.

The purchase/advert correlator may be linked to a card reader (not shown) which can read customer loyalty cards and detect data stored on or by them. The card reader may be disposed at the store's checkout.

The control computer 600 is operable to download stored statistics associated with local display screens and associated cameras across the network 196 and to collate and analyse those statistics before storing them in the statistics database 620. The statistics database 620 stores data covering a longer timespan (in this example statistics for the full year) than the statistics stored locally in memory 192 at the display screens. Representative keystamp images and a characteristic set of image parameters for each detected face are also stored in memory at the control computer. The display sequence repository 630 stores a plurality of different promotional display sequences for selective downloading to individual plasma display screens. The local display configuration module 640 enables configuration of each local display, either automatically under the control of a software program or manually by an operator of the control computer using the input device 650.

In the statistical analysis unit 610, the global headcount and demographics analyser 612 collates headcount statistics from each of the local display arrangements thus provides a comparison of the number of viewers attracted to each display (see the description of FIG. 8 below). The headcount at each display arrangement will depend on the location of the display screen 130 in the store as well as on the promotional sequences actually displayed. Other demographics such as the total number of detected faces in a given age category or gender category are also collated by the global headcount and demographics analyser 612.

The face correlation module 616 collates data on the local face IDs from individual local display arrangements and performs comparisons of characteristic face parameters determined by the face detection/recognition module 150 to determine matches for a given detected face between different cameras. Accordingly, local face IDs are correlated and assigned a global face ID where a match is found for a given face at two or more cameras. For a given global face ID, detection times and dwell times at each different camera are collated to track the progress of a given customer through the store and to establish the time spent viewing each display screen. This information is used by the customer path-tracking module 616 to determine the most likely paths through the store taken by a given subset of consumers on a given day of the week and at a given time of day, or at a given season, or in a particular purchasing "environment"—such as during a major sporting event, on a rainy afternoon, on a summers day etc (see description of FIG. 9 below).

The purchase/advert correlator 618 links purchases of products promoted on the display screens to viewing events at the plasma display screens 130. The purchase information is derived from the product barcode that is scanned at the checkout. A camera located at the checkout detects the purchasing customer's face and attempts to perform a match with a face recently detected at the relevant plasma display screen. If the purchasing customer's face matches that of one of the faces detected on a plasma display screen on which a relevant promotional sequence was actually viewed then a correlation between the advertisement and the purchase is logged along with the dwell time. Information from cameras that are directed towards the product shelves is also used to determine whether or not a promoted product was actually purchased by the customer associated with a face ID detected viewing the relevant plasma display screen.

The purchase/advert correlator 618 is also operable to analyse information on customer loyalty cards. A customer loyalty card is used to store information with regard to the purchasing profile and/or demographic grouping of the particular individual. Customer details stored on the loyalty card can thus be correlated with face detection/recognition information from cameras throughout the store and with information on which advertised products the customer has actually purchased. This provides an effective way of assessing the impact of advertising on an individual customer's purchasing behaviour. The correlation of the information from the checkout (including for example one or more of the purchased product barcode, customer facial characteristics and customer loyalty card data) with faces detected at the local display screens in this way facilitates an objective assessment of the effectiveness of the promotional displays.

Figure 7:
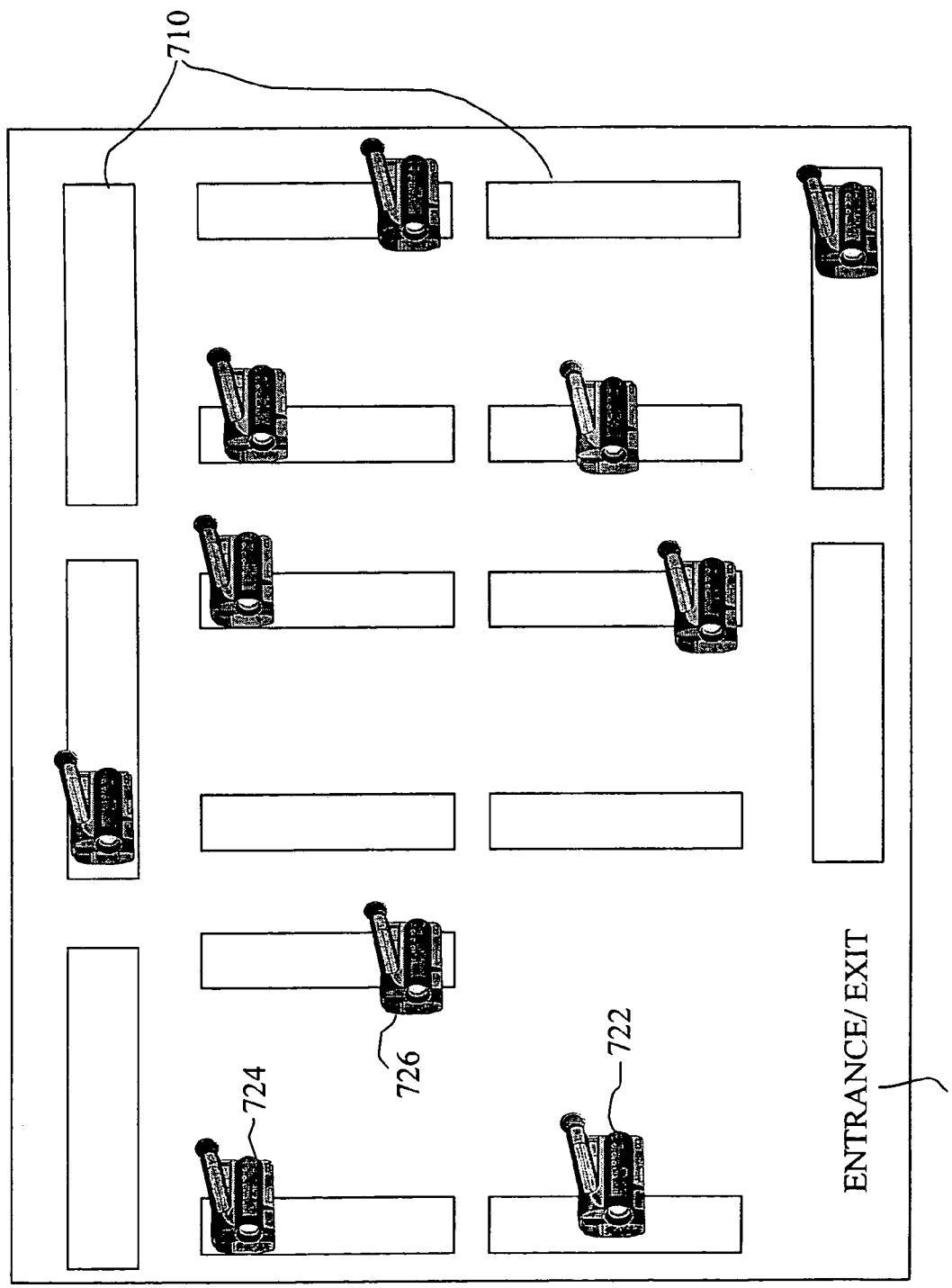
FIG. 7 schematically illustrates a store layout and the locations of a plurality of display arrangements with respect to the store layout.

FIG. 7 schematically illustrates a GUI of a store layout and the locations of a plurality of display arrangements with respect to the store layout. The regions 710 represent shelves on which products are displayed and the positions of individual display arrangements comprising display screens and associated cameras are represented by the camera icons, for example the icons 722, 724, 726. The location of each display screen in relation to the display shelves and relative to the store entrance/exit 740 is clearly indicated.

Apart from the cameras that are integral to the plasma display screens, other cameras (not shown) are also provided at the store checkouts (or indeed at other locations within the store). These checkout cameras are directed towards the purchasing customer for the purpose of detecting the customers' faces to determine whether a customer was previously detected viewing a promotional sequence on one of the plasma display screens. Furthermore, some cameras may be directed towards the goods for sale rather than towards the customer, which allows customer behaviour in terms of picking up goods from the shelf to be monitored and correlated with the face detection/recognition data from other cameras.

Figure 8:
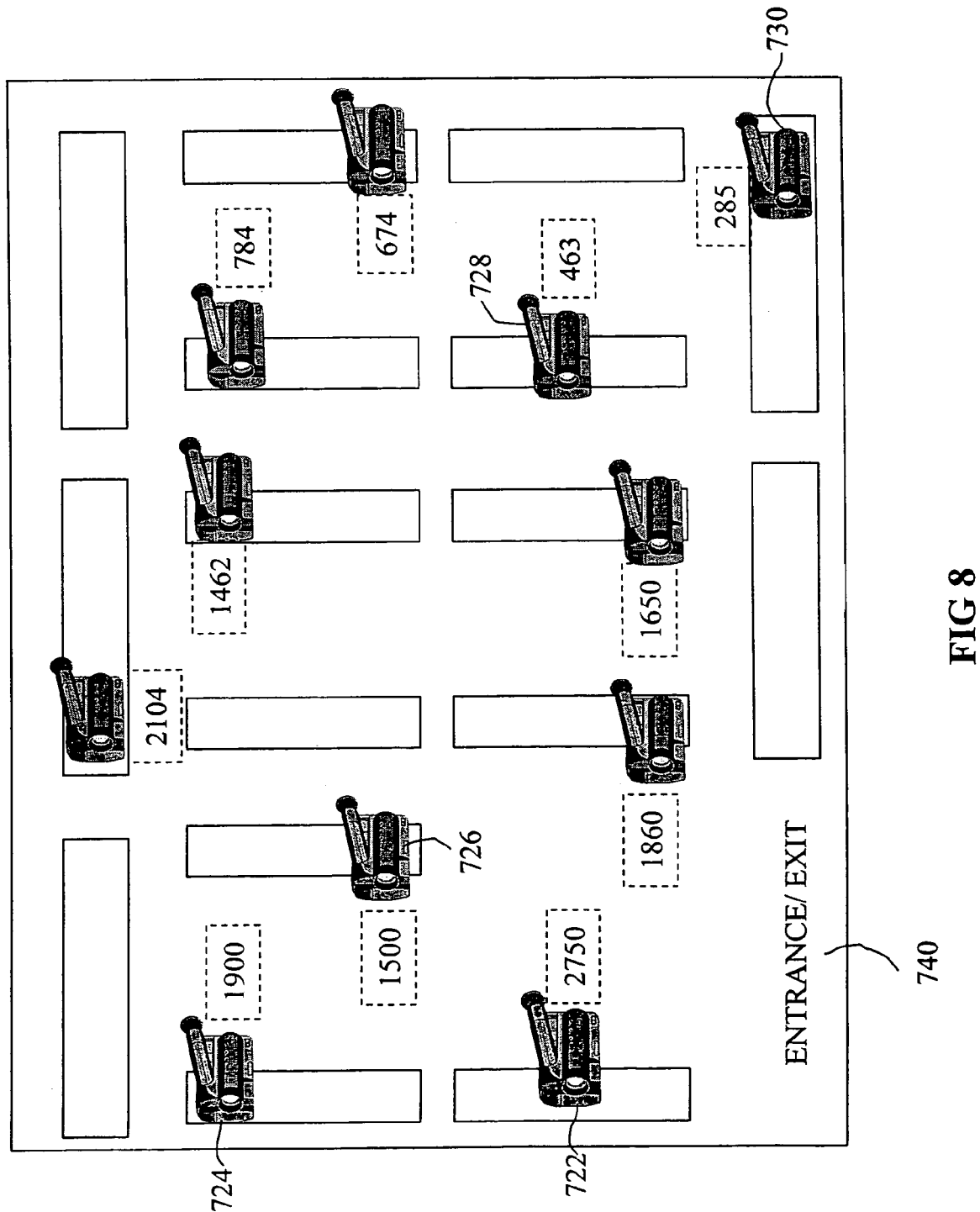
FIG. 8 schematically illustrates a global headcount statistics summary for the store and display arrangement layout of FIG. 8.

FIG. 8 schematically illustrates a global headcount statistics summary for the store and display arrangement layout of FIG. 7. It can be seen from FIG. 8 that the highest headcount of two thousand seven hundred and fifty faces occurs at the camera 722, which is located close to the store entrance/exit 740, whereas the lowest overall headcount of two-hundred and eighty five faces occurs at a camera 730, which is associated with a display screen situated in one corner of the store.

The user can access local statistics associated with each camera displayed on the GUI by selecting that camera using an input device such as a computer mouse. Each camera has a pull-down menu of associated local statistics including local headcount and dwell time (cumulative, by customer or otherwise). For a particular display area the headcount and dwell time will be functions of both the product on sale at the corresponding location and the promotional media being displayed at that display device. In the GUI the headcounts may be represented by colour coding e.g. by using red to identify headcount "hotspots" and blue to represent headcount "coldspots" (places with relatively low headcount) on the location map.

Figure 9:
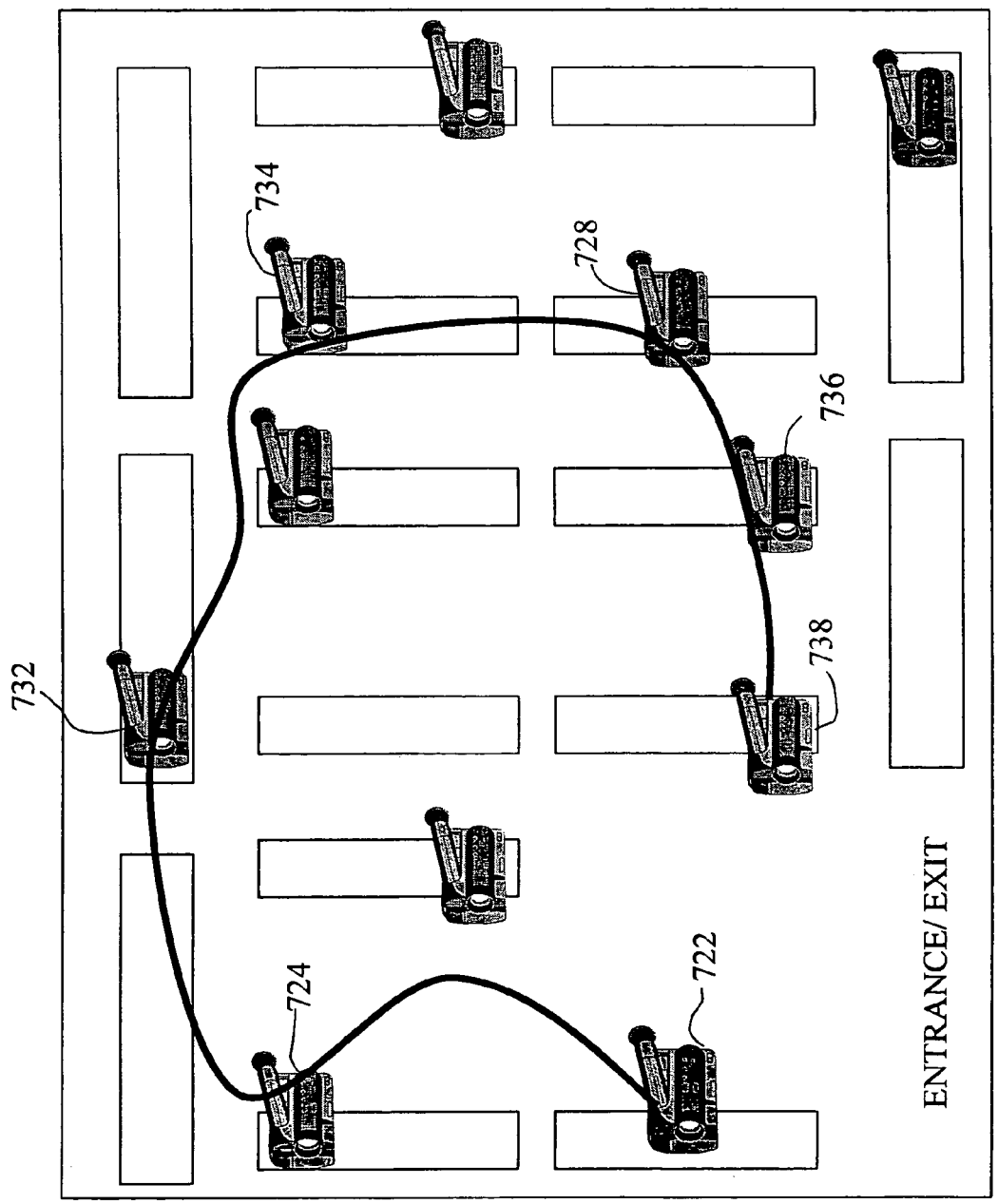
FIG. 9 schematically illustrates the most probable path followed by a customer as determined from detection and recognition of the same human face at different cameras situated at different locations in the store map of FIG. 7.

FIG. 9 schematically illustrates the most probable path (camera order) followed by a customer as determined from detection and recognition of the same human face at different cameras situated at different locations in the store map of FIG. 7. The most probable path is calculated by the customer path-tracking module 616 by correlating detection times of a give global face ID at different camera locations and by repeating this analysis for a plurality of different global face IDs.

In particular, FIG. 9 shows that the most likely path taken by a customer is from camera 722 to the left of the store entrance, then to the camera 724 and subsequently a camera 732 located towards the back wall of the store, followed by cameras 734 and 728 to the right of the store, on to a camera 736 and finally a camera 738 towards the front of the store and close to the exit 740. In this case the most probable path avoids the products at the far right hand wall of the store (as viewed from the entrance). The most probable path can be detected for different times of day or subsets of detected faces corresponding to different age categories, gender categories and so on. Accordingly, retailers can derive useful information about different customer groups and their affinity to particular product display areas. The information may be used to strategically position products according to determined customer behaviour.

Figure 10:
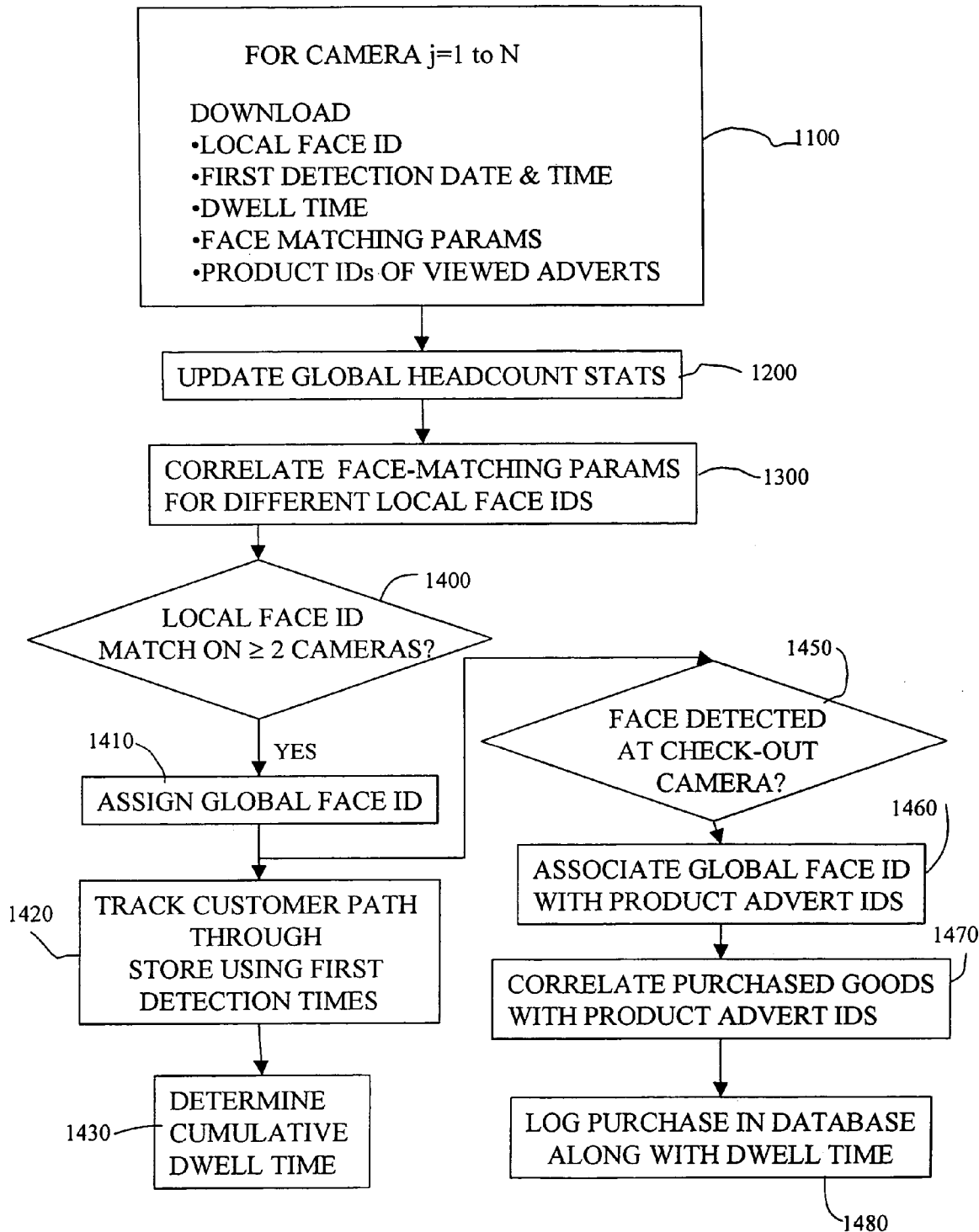
FIG. 10 is a flow chart that schematically illustrates how global statistics from a plurality of networked display devices are analysed by the control computer of FIG. 6.

FIG. 10 is a flow chart that schematically illustrates how global statistics from a plurality of networked display devices are analysed by the control computer of FIG. 6.

At a stage 1100, the control computer downloads, from the network, locally stored statistics for face detections at each of the plurality, N, of cameras situated at different locations throughout the store. The downloaded information comprises: local face IDs; dates and times of first detection for each local face ID; dwell time for each face ID at the particular camera; a set of face matching parameters used for cross-correlation of faces detected at different cameras at different times; and product IDs of adverts displayed to a customer having a given local face ID, which are used to correlate product sales with promotional sequences viewed on the plasma display screens 130.

At a stage 1200, the local headcount statistics of individual cameras are used to update the global headcount statistics (as illustrated in FIG. 8). At a stage 1300 the face-matching parameters associated with different local face IDs are correlated to determine if the same face was detected at more than one camera. At a stage 1400 it is determined whether the same face has been detected and recognised by at least two different display cameras and if so a global face ID is assigned at a stage 1410.

The process then proceeds to a stage 1420 where the path of the customer having a given global face ID is tracked between cameras at different locations in the store using the times at which the face was first detected at each camera and dwell times at individual display screens 130. At a stage 1430 a cumulative dwell time for this particular customer that includes the dwell time at every camera location at which their face was detected is calculated.

A further sequence of processing operations is performed if it is determined at a stage 1400 that a local face ID corresponds to a face detected at two or more cameras. In particular, at a stage 1450 it is determined whether one of the cameras at which the face detection was made was a camera directed to a store checkout and if so, the global face ID is associated at a stage 1460 with product advert IDs displayed at the display screen(s) at which the face corresponding to that global face ID was detected. At a stage 1470 the goods purchased by the customer at the checkout, as identified by product barcodes, are correlated with the product advert IDs and finally at a stage 1480 the correlation between purchased products and viewed adverts is logged in the statistics database 620 along with the dwell time at the display screen on which the relevant promotional advert was viewed.

The arrangements described here may enable the effectiveness of advertisements to be determined. The measure of effectiveness could be used to calculate an appropriate fee for the placement of advertisements on the display devices. Such digital signage solutions may be suitable not only for store (shop) environments but for any suitable advertising locations such as (for example) entertainment venues or railway/bus stations. Further, the techniques are not limited to advertising but may also be applied to monitoring the effectiveness of distribution and tailoring of information displayed in general. The techniques could find application in museums, schools, waiting areas etc.

Figure 11:
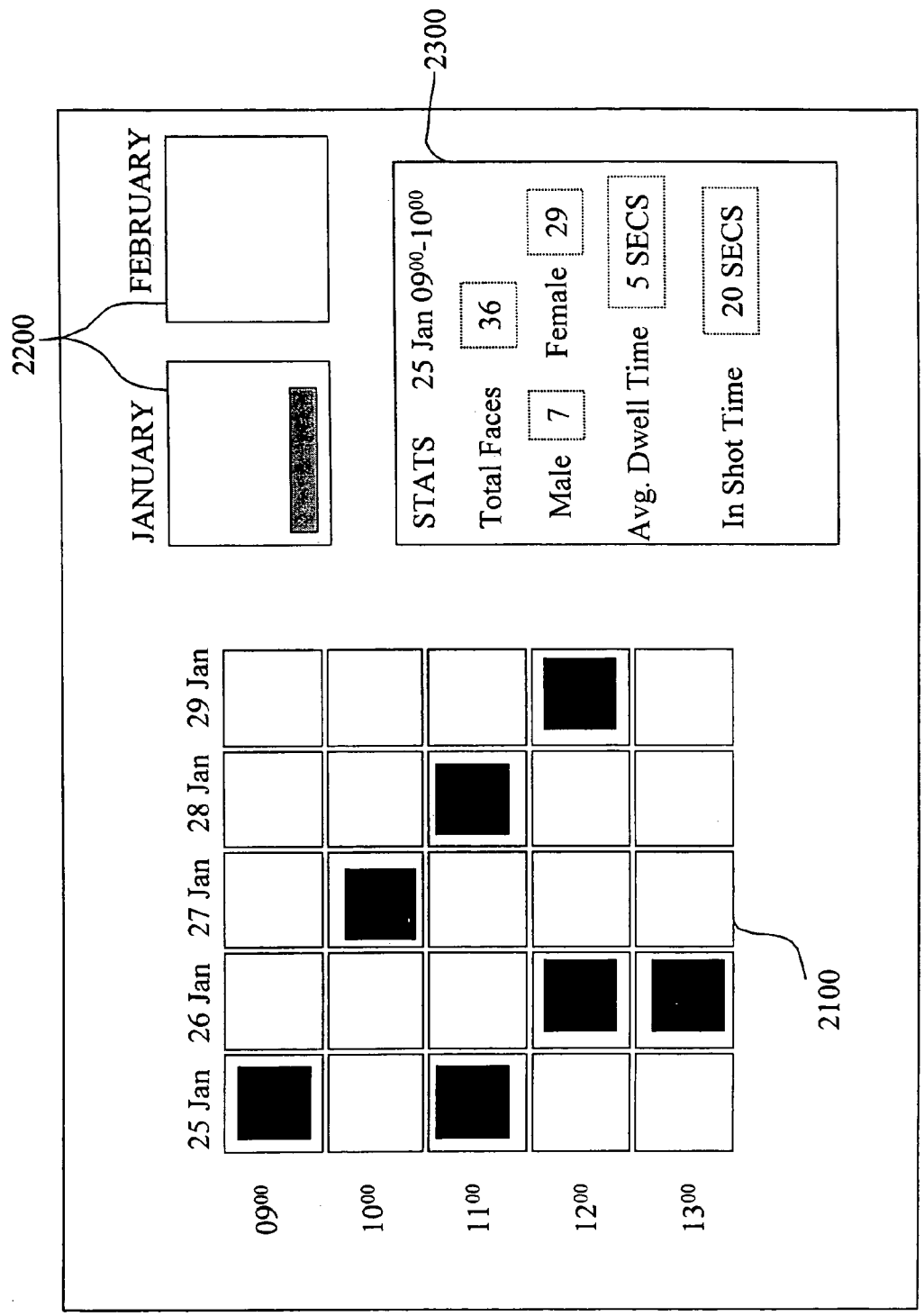
FIG. 11 schematically illustrates a graphical user interface displaying a cumulative history of global statistics from the networked display arrangements of FIG. 8.

FIG. 11 schematically illustrates a GUI displaying a cumulative history of global statistics from the networked display arrangements of FIGS. 7 to 9. The GUI comprises a time and date grid 2100 with each of five columns representing a given day and each of five rows representing a period of one hour duration. The black squares in the grid are representative keystamp images of a captured face associated with the corresponding date and time. The period of time represented by the grid can be selected via the calendar panels 2200 in the GUI. Statistics associated with a given square on the time and date grid 2100 are displayed in a window 2300.

In this example the upper left-hand box in the grid 2100 has been selected so statistics for January $25^{th}$ from 9:00 am until 10:00 am are presented. The statistics displayed comprise the total number of faces detected on all cameras in that time period, the breakdown of male and female faces, the average dwell time and the average in shot time.

The description of FIGS. 12 to 15$c$ summarises the teaching of application number PCT/GB2003/005186. Reference is made to that application for fuller details of the technical features summarised here. Features disclosed in PCT/GB2003/005186 which are not explicitly referred to in the following summary description should still be considered as (at least optional) features of the present detection arrangement.

First, a face detection technique will be described.

Then, a face "tracking" technique, operable to associate detected faces or face positions in a group of successive images, will be described.

Finally, a face "similarity" technique will be described. This technique is operable to associate together two or more distinct face "tracks", either from the same camera or from different respective cameras.

Figure 12:
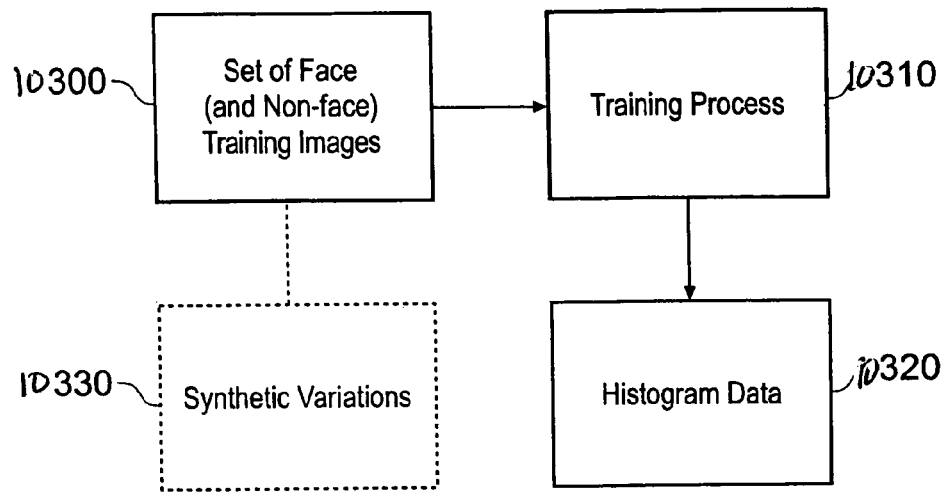
FIG. 12 is a schematic diagram illustrating a training process.
Figure 13:
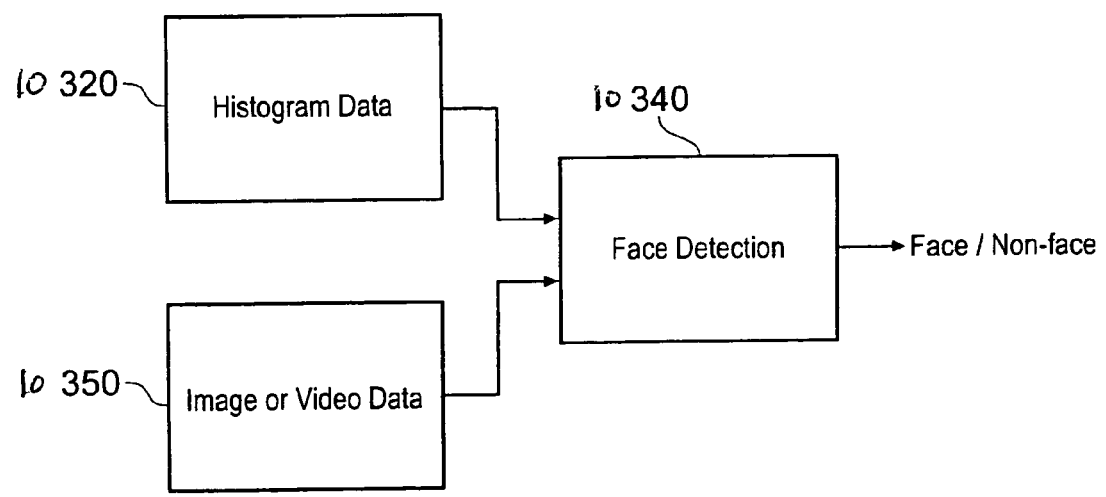
FIG. 13 is a schematic diagram illustrating a detection process.

The example face detection technique is arranged as two phases. FIG. 12 is a schematic diagram illustrating a training phase, and FIG. 13 is a schematic diagram illustrating a detection phase. The technique (and indeed the other techniques described above) may of course be embodied in a general purpose computer system running appropriate software and comprising, for example, a processing unit having (amongst other conventional components) a central processing unit (CPU), memory such as a random access memory (RAM) and non-volatile storage such as a disc drive. The computer system may be connected to a network such as a local area network or the Internet (or both). A keyboard, mouse or other user input device and display screen may also be provided. The software may be provided by a medium such as a recording medium (e.g. an optical disk) and/or a transmission medium (e.g. a network connection, an internet connection or both). The skilled man will appreciate that a general purpose computer system may include many other conventional parts which need not be described here.

Unlike some previously proposed face detection methods, the present method is based on modelling the face in parts instead of as a whole. The parts can either be blocks centred over the assumed positions of the facial features (so-called "selective sampling") or blocks sampled at regular intervals over the face (so-called "regular sampling"). The present description will cover primarily regular sampling, as this was found in empirical tests to give the better results.

In the training phase, an analysis process is applied to a set of images known to contain faces, and (optionally) another set of images ("nonface images") known not to contain faces. The process can be repeated for multiple training sets of face data, representing different views (e.g. frontal, left side, right side) of faces. The analysis process builds a mathematical model of facial and nonfacial features, against which a test image can later be compared (in the detection phase).

So, to build the mathematical model (the training process 10310 of FIG. 12), the basic steps are as follows:

1. From a set 10300 of face images normalised to have the same eye positions, each face is sampled regularly into small blocks.
2. Attributes are calculated for each block;
3. The attributes are quantised to a manageable number of different values.
4. The quantised attributes are then combined to generate a single quantised value in respect of that block position.
5. The single quantised value is then recorded as an entry in a histogram. The collective histogram information 10320 in respect of all of the block positions in all of the training images forms the foundation of the mathematical model of the facial features.

One such histogram is prepared for each possible block position, by repeating the above steps in respect of a large number of test face images. So, in a system which uses an array of 8×8 blocks, 64 histograms are prepared. In a later part of the processing, a test quantised attribute is compared with the histogram data; the fact that a whole histogram is used to model the data means that no assumptions have to be made about whether it follows a parameterised distribution, e.g. Gaussian or otherwise. To save data storage space (if needed), histograms which are similar can be merged so that the same histogram can be reused for different block positions.

In the detection phase, to apply the face detector to a test image 10350, successive windows in the test image are processed 10340 as follows:

6. The window is sampled regularly as a series of blocks, and attributes in respect of each block are calculated and quantised as in stages 1-4 above.
7. Corresponding "probabilities" for the quantised attribute values for each block position are looked up from the corresponding histograms. That is to say, for each block position, a respective quantised attribute is generated and is compared with a histogram previously generated in respect of that block position (or with multiple histograms in the case of multiple training sets representing different views). The way in which the histograms give rise to "probability" data will be described below.
8. All the probabilities obtained above are multiplied together to form a final probability which is compared against a threshold in order to classify the window as "face" or "nonface". It will be appreciated that the detection result of "face" or "nonface" is a probability-based measure rather than an absolute detection. Sometimes, an image not containing a face may be wrongly detected as "face", a so-called false positive. At other times, an image containing a face may be wrongly detected as "nonface", a so-called false negative. It is an aim of any face detection system to reduce the proportion of false positives and the proportion of false negatives, but it is of course understood that to reduce these proportions to zero is difficult, if not impossible, with current technology.

As mentioned above, in the training phase, a set of "nonface" images can be used to generate a corresponding set of "nonface" histograms. Then, to achieve detection of a face, the "probability" produced from the nonface histograms may be compared with a separate threshold, so that the probability has to be under the threshold for the test window to contain a face. Alternatively, the ratio of the face probability to the nonface probability could be compared with a threshold.

Extra training data may be generated by applying "synthetic variations" 10330 to the original training set, such as variations in position, orientation, size, aspect ratio, background scenery, lighting intensity and frequency content.

Face Tracking

A face tracking algorithm will now be described. The tracking algorithm aims to improve face detection performance in image sequences.

The initial aim of the tracking algorithm is to detect every face in every frame of an image sequence. However, it is recognised that sometimes a face in the sequence may not be detected. In these circumstances, the tracking algorithm may assist in interpolating across the missing face detections.

Ultimately, the goal of face tracking is to be able to output some useful metadata from each set of frames belonging to the same scene in an image sequence. This might include:
Number of faces.
"Mugshot" (a colloquial word for an image of a person's face, derived from a term referring to a police file photograph) of each face.
Frame number at which each face first appears.
Frame number at which each face last appears.
Identity of each face (either matched to faces seen in previous scenes, or matched to a face database)

The tracking algorithm uses the results of the face detection algorithm, run independently on each frame of the image sequence, as its starting point. Because the face detection algorithm may sometimes miss (not detect) faces, some method of interpolating the missing faces is useful. To this end, a Kalman filter is used to predict the next position of the face and a skin colour matching algorithm was used to aid tracking of faces. In addition, because the face detection algorithm often gives rise to false acceptances, some method of rejecting these is also useful.

Figure 14:
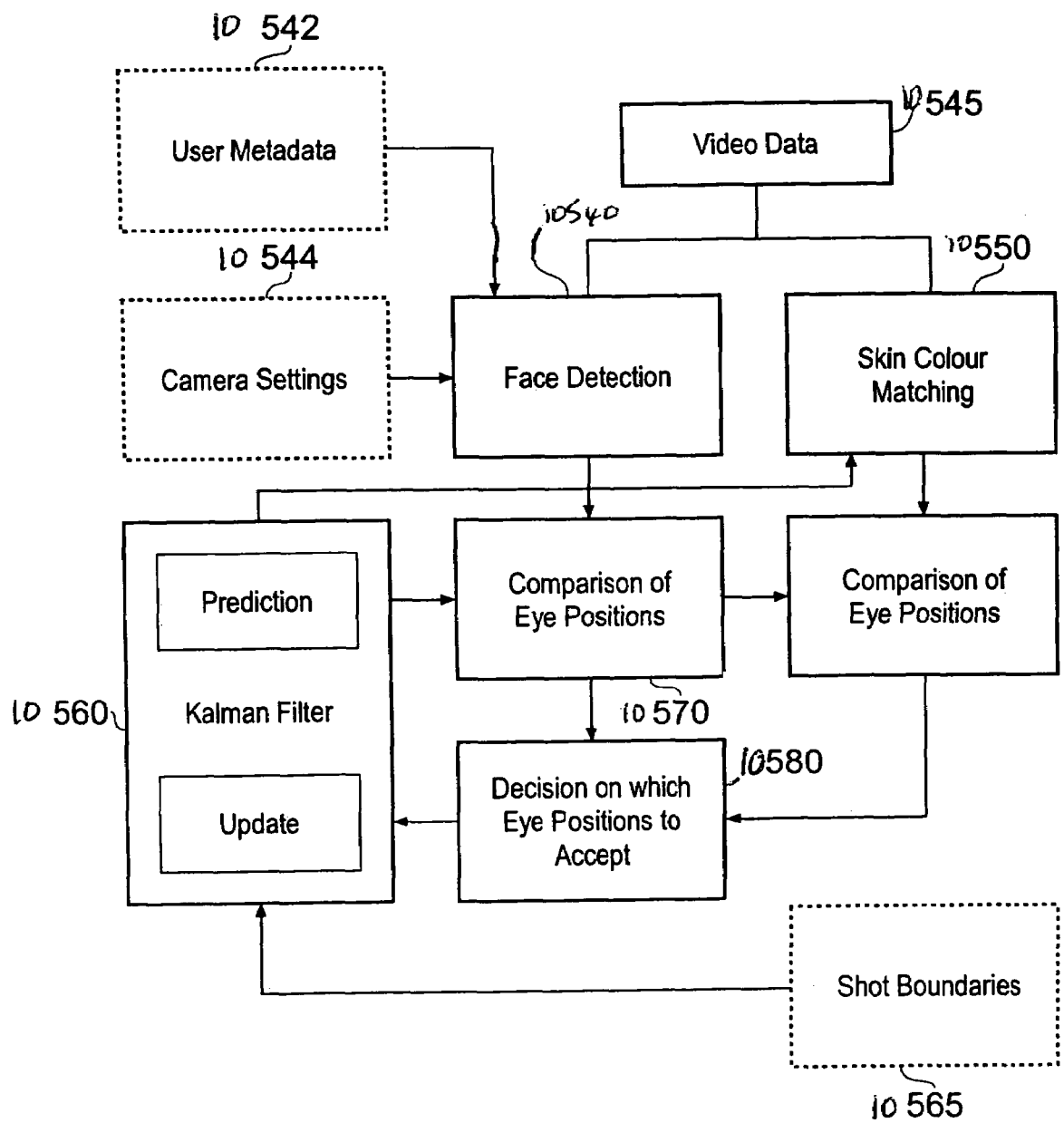
FIG. 14 schematically illustrates a face tracking algorithm.

The algorithm is shown schematically in FIG. 14.

In summary, input video data 10545 (representing the image sequence) is supplied to a face detector of the type described in this application, and a skin colour matching detector 10550. The face detector attempts to detect one or more faces in each image. When a face is detected, a Kalman filter 10560 is established to track the position of that face. The Kalman filter generates a predicted position for the same face in the next image in the sequence. An eye position comparator 10570, 10580 detects whether the face detector 10540 detects a face at that position (or within a certain threshold distance of that position) in the next image. If this is found to be the case, then that detected face position is used to update the Kalman filter and the process continues.

If a face is not detected at or near the predicted position, then a skin colour matching method 10550 is used. This is a less precise face detection technique which is set up to have a lower threshold of acceptance than the face detector 10540, so that it is possible for the skin colour matching technique to detect (what it considers to be) a face even when the face detector cannot make a positive detection at that position. If a "face" is detected by skin colour matching, its position is passed to the Kalman filter as an updated position and the process continues.

If no match is found by either the face detector 10450 or the skin colour detector 10550, then the predicted position is used to update the Kalman filter.

All of these results are subject to acceptance criteria (see below). So, for example, a face that is tracked throughout a sequence on the basis of one positive detection and the remainder as predictions, or the remainder as skin colour detections, will be rejected.

A separate Kalman filter is used to track each face in the tracking algorithm.

It is noted that the tracking process is not limited to tracking through a video sequence in a forward temporal direction. Assuming that the image data remain accessible (i.e. the process is not real-time, or the image data are buffered for temporary continued use), the entire tracking process could be carried out in a reverse temporal direction. Or, when a first face detection is made (often part-way through a video sequence) the tracking process could be initiated in both temporal directions. As a further option, the tracking process could be run in both temporal directions through a video sequence, with the results being combined so that (for example) a tracked face meeting the acceptance criteria is included as a valid result whichever direction the tracking took place.

Advantages of the Tracking Algorithm

The face tracking technique has three main benefits:

It allows missed faces to be filled in by using Kalman filtering and skin colour tracking in frames for which no face detection results are available. This increases the true acceptance rate across the image sequence.

It provides face linking: by successfully tracking a face, the algorithm automatically knows whether a face detected in a future frame belongs to the same person or a different person. Thus, scene metadata can easily be generated from this algorithm, comprising the number of faces in the scene, the frames for which they are present and providing a representative mugshot of each face.

False face detections tend to be rejected, as such detections tend not to carry forward between images.

Figure 15A:
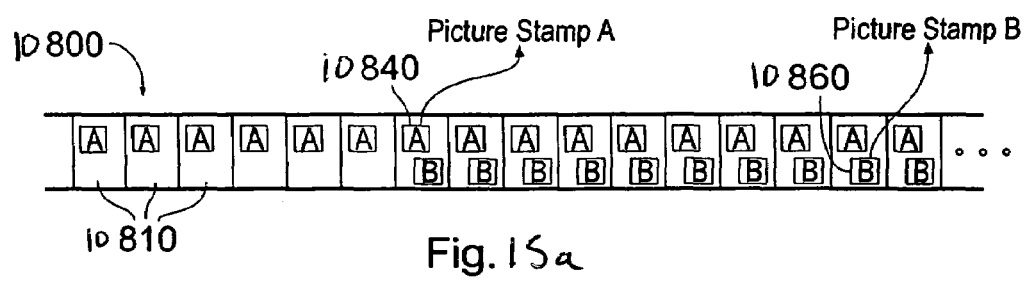
FIGS. 15a to 15c schematically illustrate the use of face tracking when applied to a video scene.
Figure 15B:
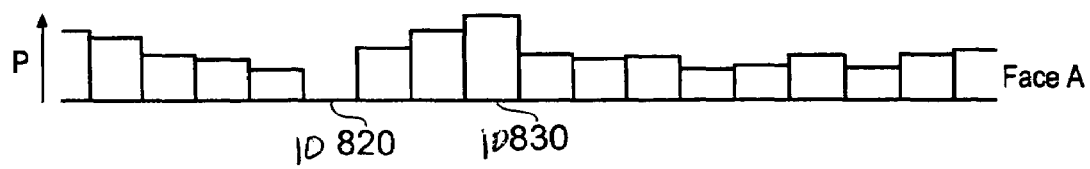
Figure 15C:
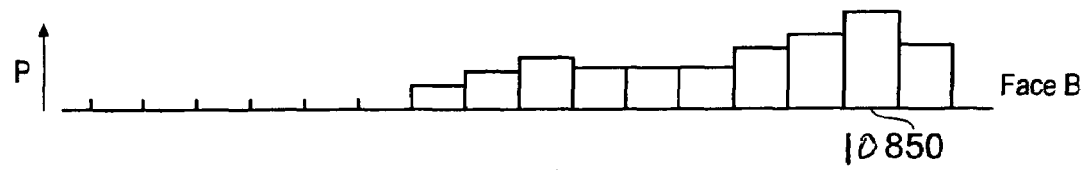

FIGS. 15a to 15c schematically illustrate the use of face tracking when applied to a video scene.

In particular, FIG. 15a schematically illustrates a video scene 10800 comprising successive video images (e.g. fields or frames) 10810.

In this example, the images 10810 contain one or more faces. In particular all of the images 10810 in the scene include a face A, shown at an upper left-hand position within the schematic representation of the image 10810. Also, some of the images include a face B shown schematically at a lower right hand position within the schematic representations of the images 10810.

A face tracking process is applied to the scene of FIG. 15a. Face A is tracked reasonably successfully throughout the scene. In one image 10820 the face is not tracked by a direct detection, but the skin colour matching techniques and the Kalman filtering techniques described above mean that the detection can be continuous either side of the "missing" image 10820. The representation of FIG. 15b indicates the detected probability of face A being present in each of the images, and FIG. 15c shows the corresponding probability values for face B. To distinguish between the track for face A and the track for face B, unique (at least with respect to other tracks in the system) identification numbers are assigned to each track.

In the system described above and in PCT/GB2003/005186, during face detection and tracking, a person's track is terminated if the face turns away from the camera for a prolonged period of time or disappears from the scene briefly. On returning to the scene, the face is detected again but a different track is started, and the new track is given a different identification (ID) number.

So-called "face similarity" or "face matching" techniques will now be described.

The aim of face similarity is to recover the identity of the person in these situations, so that an earlier face track and a later face track, or respective tracks from different cameras (relating to the same person), may be linked together. In this arrangement, at least in principle, each person is assigned a unique ID number. When the person returns to the scene, the algorithm attempts to reassign the same ID number by using face matching techniques.

The face similarity method is based on comparing several face "stamps" (images selected to be representative of that tracked face) of a newly encountered individual to several face stamps of previously encountered individuals or individuals encountered elsewhere. Note that face stamps need not be square. Several face stamps belonging to one individual are obtained from the face detection and tracking component of the system. As described above, the face tracking process temporally links detected faces, such that their identity is maintained throughout the sequence of video frames as long as the person does not disappear from the scene or turn away from the camera for too long. Thus the face detections within such a track are assumed to belong to the same person and face stamps within that track can be used as a face stamp "set" for one particular individual.

A fixed number of face stamps is kept in each face stamp set. The way in which face stamps are selected from a track is described below. Then, a "similarity measure" of two face stamp sets will be described. There will then follow a description of how the similarity method is used within the face detection and tracking system. But first, FIG. 16 will be described, in order to place the face similarity techniques into the context of the overall tracking system.

Figure 16:
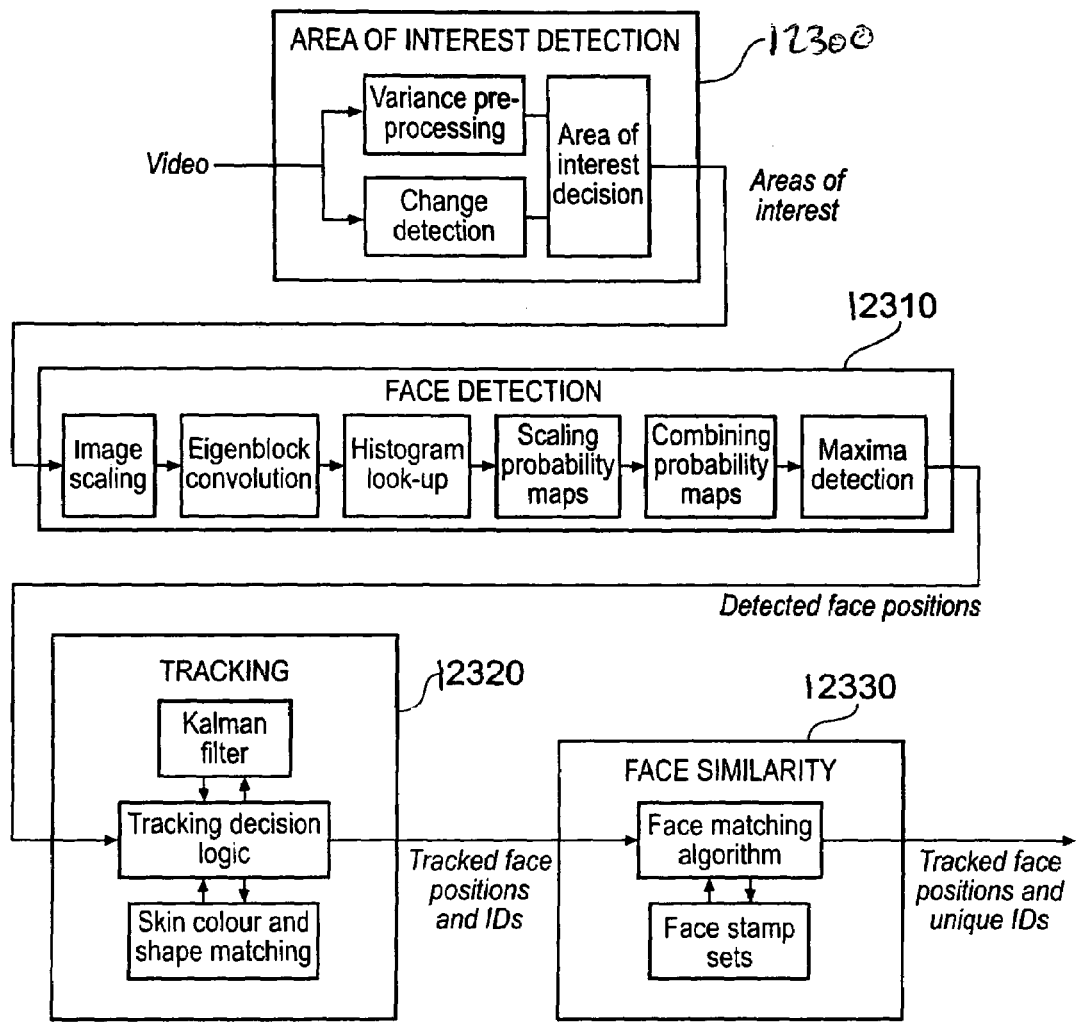
FIG. 16 is a schematic diagram of a face detection and tracking system.

FIG. 16 schematically illustrates a face detection and tracking system, as described above, but placing the face similarity functionality into a technical context. This diagram summarises the process described above and in PCT/GB2003/005186.

At a first stage 12300, so-called "area of interest" logic derives those areas within an image at which face detection is to take place. At those areas of interest, face detection 12310 is carried out to generate detected face positions. Then face tracking 12320 is carried out to generate tracked face positions and IDs. Finally, the face similarity function 12330 is used to match face stamp sets.

Selection of Stamps for the Face Stamp Set

In order to create and maintain a face stamp set, a fixed number (n) of stamps is selected from a temporally linked track of face stamps. The criteria for selection are as follows:

1. The stamp has to have been generated directly from face detection, not from colour tracking or Kalman tracking. In addition, it is only selected if it was detected using histogram data generated from a "frontal view" face training set.

2. Once the first n stamps have been gathered (by following, for example, a forward temporal order through the images constituting the face track), the similarity (see below) of each new stamp available from the track (in the temporal order) with the existing face stamp set is measured. The similarity of each face stamp in the track with the remaining stamps in the stamp set is also measured and stored. If the newly available face stamp is less similar to the face stamp set than an existing element of the face stamp set is to the face stamp set, that existing element is disregarded and the new face stamp is included in the face stamp set. Stamps are chosen in this way so that, by the end of the selection process, the largest amount of variation available is incorporated within the face stamp set. This tends to make the face stamp set more representative for the particular individual.

If fewer than n stamps are gathered for one face stamp set, this face stamp set is not used for similarity assessment as it probably does not contain much variation and is therefore not likely to be a good representation of the individual.

This technique has applications not only in the face similarity algorithm, but also in selecting a set of representative pictures stamps of any object for any application.

A good example is in so-called face logging. There may be a requirement to represent a person who has been detected and logged walking past a camera. A good way to do this is to use several pictures stamps. Ideally, these pictures stamps should be as different from each other as possible, such that as much variation as possible is captured. This would give a human user or automatic face recognition algorithm as much chance as possible of recognising the person.

Similarity Measure

In comparing two face tracks, to detect whether they represent the same individual, a measure of similarity between the face stamp set of a newly encountered individual (setB) and that of a previously encountered individual (setA) is based on how well the stamps in face stamp setB can be reconstructed from face stamp setA. If the face stamps in setB can be reconstructed well from face stamps in setA, then it is considered highly likely that the face stamps from both setA and setB belong to the same individual and thus it can be said that the newly encountered person has been detected before.

The same technique is applied to the arrangement described above, namely the selection of face images for use as a face stamp set representing a particular face track. In that case, the similarity between each newly encountered candidate face stamp and the existing stamps in the set, and the mutual similarity between stamps within the existing set, would be considered in the same way as a the similarity between a stamp from setB and stamps from setA in the description that follows.

A stamp in face stamp setB is reconstructed from stamps in setA in a block-based fashion. This process is illustrated schematically in FIG. 17.

Figure 17:
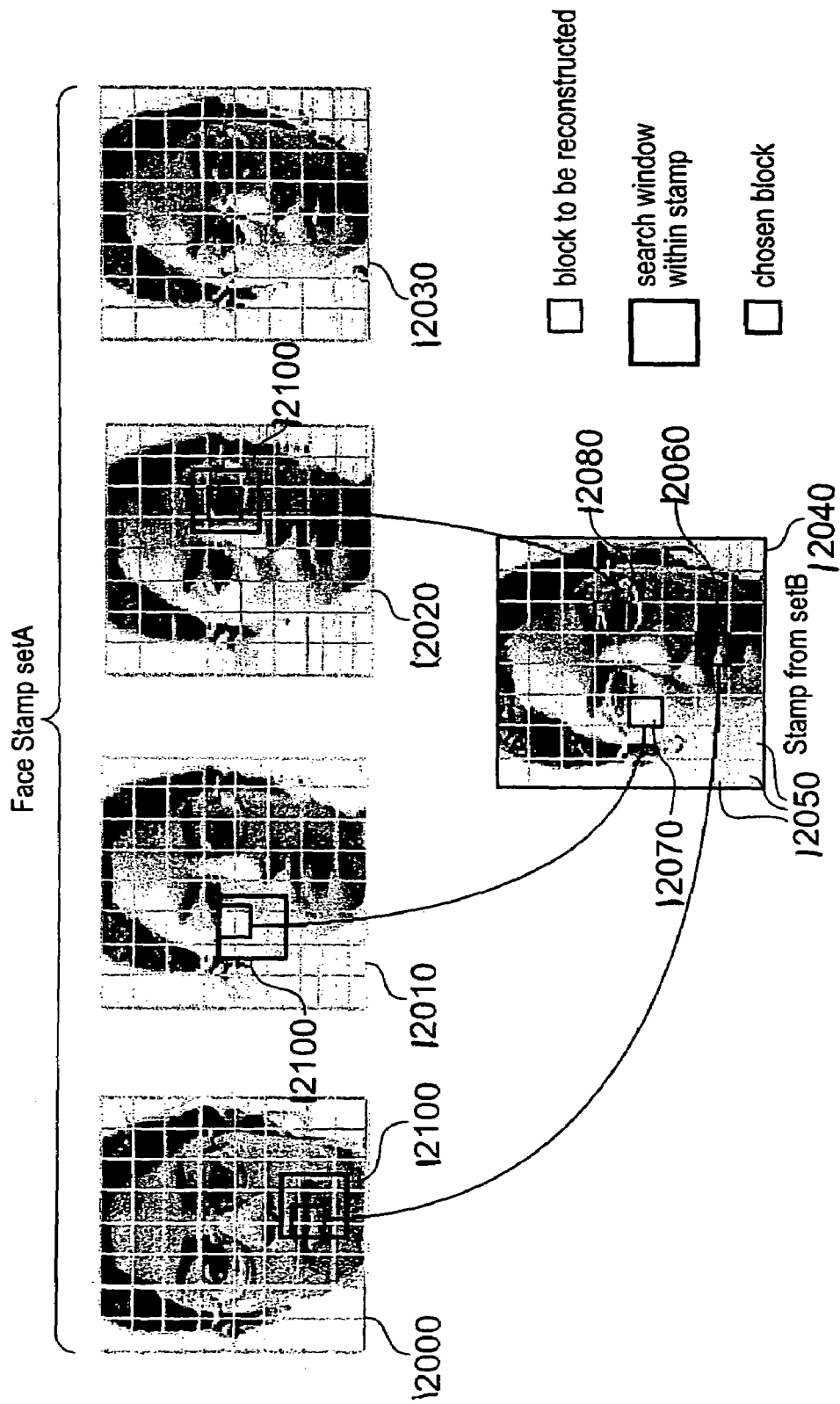
FIG. 17 schematically illustrates a similarity detection technique.

FIG. 17 schematically shows a face stamp setA having four face stamps 12000, 12010, 12020, 12030. (Of course it will be understood that the number four is chosen merely for clarity of the diagram, and that the skilled person could select a different number for an actual implementation). A stamp 12040 from face stamp setB is to be compared with the four stamps of setA.

Each non-overlapping block 2050 in the face stamp 12040 is replaced with a block chosen from a stamp in face stamp setA. The block can be chosen from any stamp in setA and from any position in the stamp within a neighbourhood or search window 12100 of the original block position. The block within these positions which gives the smallest mean squared error (MSE) is chosen to replace the block being reconstructed by using a motion estimation method. (A good motion estimation technique to use is one which gives the lowest mean squared error in the presence of lighting variations while using a small amount of processing power). Note that the blocks need not be square. In the example shown, a block 12060 is replaced by a nearby block from the stamp 12000; a block 12070 by a block from the face stamp 12010; and a block 12080 by a block from the face stamp 12020, and so on.

When a face stamp is being reconstructed, each block can be replaced by a block from a corresponding neighbourhood in the reference face stamp. But optionally, in addition to this neighbourhood, the best block can also be chosen from a corresponding neighbourhood in the reflected reference face stamp. This can be done because faces are roughly symmetrical. In this way, more variation present in the face stamp set can be utilised.

Each face stamp used is of size 64×64 and is divided into blocks of size 8×8. The face stamps used for the similarity measurement are more tightly cropped than the ones output by the face detection component of the system. This is in order to exclude as much of the background as possible from the similarity measurement.

To crop the image, a reduced size is selected (or predetermined)—for example 50 pixels high by 45 pixels wide (allowing for the fact that most faces are not square). The group of pixels corresponding to a central area of this size are then resized so that the selected area fills the 64×64 block once again. This involves some straightforward interpolation. The resizing of a central non-square area to fill a square block means that the resized face can look a little stretched.

The choice of a cropping area (e.g. a 50×45 pixel area) can be predetermined or can be selected in response to attributes of the detected face in each instance. Resizing in each case to the 64×64 block means that comparisons of face stamps—whether cropped or not—take place at the same 64×64 size.

Once the whole stamp is reconstructed in this way, the mean squared error between the reconstructed stamp and the stamp from setB is calculated. The lower the mean squared error, the higher the amount of similarity between the face stamp and face stamp setA.

In the case of a comparison between two face stamp set, each stamp in face stamp setB is reconstructed in the same way and the combined mean squared error is used as the similarity measure between the two face stamp sets.

Thus the algorithm makes full use of the fact that several face stamps are available for each person to be matched. Furthermore the algorithm is robust to imprecise registration of faces to be matched.

In the system described above, newly gathered face stamp sets are reconstructed from existing face stamp sets in order to generate a similarity measure. The similarity measure obtained by reconstructing a face stamp set from another face stamp set (A from B) is usually different from when the latter face stamp set is reconstructed from the former one (B from A). Thus, in some cases, an existing face stamp set could give a better similarity measure when reconstructed from a new face stamp set than vice versa, for example if the existing face stamp set were gathered from a very short track. Therefore in order to increase the likelihood of successful merges between similar faces, the two similarity measures can be combined (e.g. averaged).

A further optional variation will now be described. When a face stamp is being reconstructed, each block is replaced by a block of the same size, shape and orientation from the reference face stamp. But if the size and orientation of a subject are different in the two face stamps, these face stamps will not be well reconstructed from each other as blocks in the face stamp being reconstructed will not match well with blocks of the same size, shape and orientation. This problem can be overcome by allowing blocks in the reference face stamp to take any size, shape and orientation. The best block is thus chosen from the reference face stamp by using a high order geometric transformation estimation (e.g. rotation, zoom, amongst others). Alternatively the whole reference face stamp can be rotated and resized prior to reconstructing the face stamp by the basic method.

In order to make the similarity measure slightly more robust to lighting variations, each face stamp is first normalised to have a mean luminance of zero and a variance of one.

Use of Face Similarity Component within the Object Tracking System

It has been seen that object tracking allows a person's identity to be maintained throughout a sequence of video frames as long as he/she does not disappear from the scene. The aim of the face similarity component is to be able to link tracks such that the person's identity is maintained even if he/she temporarily disappears from the scene or turns away from the camera, or if the scenes are captured from different respective cameras.

During the operation of the face detection and object tracking system, a new face stamp set is initiated each time a new track is started. The new face stamp set is initially given a unique (i.e. new compared to previously tracked sets) ID. As each stamp of the new face stamp set is acquired, its similarity measure ($S_i$) with all the previously gathered face stamp sets is calculated. This similarity measure is used to update the combined similarity measure ($S_i-1$) of the existing elements of the new face stamp set with all the previously gathered face stamp sets in an iterative manner:

$$^jS_i = 0.9 *^j S_i - 1 + 0.1 *^j S_i$$

where the superscript j denotes comparison with the previously gathered face stamp set j.

If the similarity of the new face stamp set to a previously encountered face stamp set is above a certain threshold (T) and the number of elements in the new face stamp set is at least n (see above), then the new face stamp set is given the same ID as the previous face stamp set. The two face stamp sets are then merged to produce just one face stamp set containing as much of the variation contained in the two sets as possible by using the same similarity-comparison method as described in the above section.

The new face stamp set is discarded if its track terminates before n face stamps are gathered.

If the similarity measure of the new face stamp set is above the threshold T for more than one stored face stamp set, this means that the current person appears to be a good match to two previous people. In this case an even more severe similarity threshold (i.e. an even lower difference threshold) is required to match the current person to either of the two previous persons.

In addition to the similarity criterion, another criterion can help in deciding whether two face stamp sets should be merged or not. This criterion comes from the knowledge that two face stamps sets belonging to the same individual cannot overlap in time. Thus two face stamp sets which have appeared in the picture (i.e. from a single camera) at the same time for more than a small number of frames can never be matched to each other. But if they coincide in time but originate from different cameras, the question of matching is slightly more complicated and requires a user to set up the system with camera positions in mind. If the two cameras are directed at the same or similar positions (i.e. so that a person could conceivably be seen by both cameras simultaneously) then matching is allowed. If the two cameras are such that a person could not physically be seen by both simultaneously, then matching of concurrent detections is not allowed. This is all achieved by keeping a record of all the face stamp sets which have ever co-existed in the picture or pictures, using a co-existence matrix. The matrix stores the number of frames for which every combination of two face stamp sets have ever co-existed. If this number is greater than a small number of frames, e.g. 10 frames (to allow for the period during which a track can sometimes float off a face for a few frames prior to being deleted), then it is not permitted to merge the two face stamp sets into the same ID. An example of a coexistence matrix for five people (tracks) numbered ID 1 to ID 5 will now be given. The example concerns only one camera, for simplicity of the explanation, but (as described above) the technique is extendable to multiple cameras.

| track ID | 1 | 2 | 3 | 4 | 5 |
|---|---|---|---|---|---|
| 1 | 234 | 0 | 0 | 87 | 5 |
| 2 | 0 | 54 | 22 | 0 | 0 |

-continued

| track ID | 1 | 2 | 3 | 4 | 5 |
|---|---|---|---|---|---|
| 3 | 0 | 22 | 43 | 0 | 0 |
| 4 | 87 | 0 | 0 | 102 | 5 |
| 5 | 5 | 0 | 0 | 5 | 5 |

The matrix shows that:

ID 1 has appeared for a total of 234 frames (though these may not have been contiguous). It has never appeared in shot at the same time as IDs 2 or 3, and therefore it could potentially be merged with one of these people in future. It has co-existed with ID 4 for 87 frames and so should never be merged with this person. It has also co-existed for 5 frames with ID 5. This is less than the threshold number of frames and so these two IDs can still potentially be merged together.

ID 2 has appeared for a total of 54 frames (though these may not have been contiguous). It has only ever co-existed with ID 3, and so may not ever be merged with this person. However, it can potentially be merged with IDs 1, 4 or 5 in future, should the faces have a good match.

ID 3 has appeared for a total of 43 frames (though these may not have been contiguous). It has only ever co-existed with ID 2, and so may not ever be merged with this person. However, it can potentially be merged with IDs 1, 4 or 5 in future, should the faces have a good match.

ID 4 has appeared for a total of 102 frames (though these may not have been contiguous). It has never appeared in shot at the same time as IDs 2 or 3, therefore it could potentially be merged with one of these people in future. It has co-existed with ID 1 for 87 frames and so should never be merged with this person. It has also co-existed for 5 frames with face 5. This is less than the threshold number of frames and so these two IDs can still potentially be merged together.

ID 5 has appeared for a total of just 5 frames (though these may not have been contiguous). It has co-existed with IDs 1 and 4 for all these frames, but may still be merged with either of them because this is less than the threshold. It may also be merged with IDs 2 or 3, since it has never co-existed with these IDs.

If two IDs are merged due to high face similarity, the co-existence matrix is updated by combining the co-existence information for the two merged IDs. This is done by simply summing the quantities in the rows corresponding to the two IDs, followed by summing the quantities in the columns corresponding to the two IDs.

e.g. if ID 5 were merged with ID 1, the co-existence matrix above would become:

| | 1 | 2 | 3 | 4 |
|---|---|---|---|---|
| 1 | 239 | 0 | 0 | 92 |
| 2 | 0 | 54 | 22 | 0 |
| 3 | 0 | 22 | 43 | 0 |
| 4 | 92 | 0 | 0 | 102 |

If ID 1 were subsequently merged with ID 2, the co-existence matrix above would become:

|   | 1   | 3  | 4   |
| - | --- | -- | --- |
| 1 | 293 | 22 | 92  |
| 3 | 22  | 43 | 0   |
| 4 | 92  | 0  | 102 |

It should be noted that:

ID 1 cannot no be merged with any further existing people.

A convention is used in this embodiment whereby the lowest ID number is always retained after two IDs have been merged.

IDs are not permitted to be merged while they are both still present in the picture.

In the similarity detection process for generating and for merging face stamp sets, a face stamp typically needs to be reconstructed several times from other face stamps. This means that each block needs to be matched several times using a motion estimation method. For some motion estimation methods, the first step is to compute some information about the block that needs to be matched, irrespective of the reference face stamp used. As the motion estimation needs to be carried out several times, this information can be stored alongside the face stamp, so that it doesn't need to be calculated each time a block has to be matched, thus saving processing time.

The IDs mentioned above can be used (after the matching process) as the basis of the "global face IDs" mentioned earlier.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A display arrangement, comprising:
    an image display device to display at least one image representing advertising material for goods or services for sale in a shop, the image display device including a first camera directed towards locations adopted by viewers viewing the image display device, and the first camera being configured to capture images of faces of the viewers as the viewers view the image display device;
    one or more further cameras directed towards other respective locations, at least one of the further cameras being directed towards a checkout of the shop to capture images of purchasers;
    a face detector for detecting human faces of the purchasers and the viewers in images captured by the cameras, the face detector being arranged to detect a total dwell time of each of the faces detected by the first camera, and the dwell time is a time that each of the faces is directed towards the image display device; and
    a correlation detector to correlate faces which appear in images captured by both the first camera and at least one of the further cameras by detecting whether a purchaser whose face is detected at the checkout was also detected as a viewer of the image display device.

2. The arrangement according to claim 1, further comprising one or more further image display devices, and at least one of the further cameras is directed towards positions adopted by viewers viewing one of the further image display devices.

3. The arrangement according to claim 1, wherein:
    at least one of the further cameras is directed towards a position the purchaser would adopt in selecting goods for sale, and
    at least one image displayed on the image display device represents advertising material for the goods for sale.

4. The arrangement according to claim 1, further comprising:
    logic to detect whether goods or services being purchased by the purchaser include goods or services viewed on the image display device by the purchaser.

5. The arrangement according to claim 1, further comprising:
    logic to generate data indicating a number of faces detected at each camera.

6. The arrangement according to claim 1, further comprising:
    logic to generate data indicating a cumulative dwell time of the faces of the purchasers and the viewers.

7. The arrangement according to claim 1, further comprising:
    logic to detect an order in which the face of a viewer is detected at two or more of the cameras.

8. The arrangement according to claim 1, further comprising:
    a reader for a portable storage device carried by the viewer, the portable storage device storing at least a viewer identifier; and
    a store for storing data correlating the viewer identifiers and detected faces.

9. The arrangement according to claim 1, wherein the face detector detects a cumulative dwell time representing a total time spent viewing the image display device by each of the faces detected by the first camera within a given time period or by a predetermined category of the detected faces.

10. The arrangement according to claim 1, further comprising:
    a statistical analysis module configured to maintain cumulative statistical data on the faces of the viewers detected locally by the first camera, including a headcount of distinct faces, gender data, and age category data.

11. The arrangement according to claim 10, wherein the statistical analysis module mains cumulative statistical data on an ethnic origin, specific physical characteristics and categories of emotional expressions on the faces of the viewers.

12. The arrangement according to claim 1, wherein the image display device displays the advertising material according to an age of a viewer.

13. A display method, comprising:
    using a first camera to capture images of viewers viewing an image display device at a first location, at least one image displayed on the image display device representing advertising material for goods or services for sale in a shop;
    using one or more further cameras to capture images of the viewers at one or more other respective locations, at least one of the further cameras being directed towards a checkout of the shop to capture images of purchasers;
    detecting human faces in the captured images;
    detecting a total dwell time of each of the faces detected by the first camera, the dwell time being a time that each of the faces is directed towards the image display device; and correlating the faces which appear in the images captured by the first camera and the at least one of the further cameras by detecting whether a purchaser whose face is detected at the checkout was also detected as a viewer of the image display device.

14. A computer readable storage medium including computer executable instructions, wherein the instructions, when executed by a processor, cause the processor to perform the method according to claim 13.

15. The method according to claim 13, further comprising: using an eigenface method of face recognition in the detecting human faces.

* * * * *